(12) United States Patent
Yukawa et al.

(10) Patent No.: US 11,130,300 B2
(45) Date of Patent: Sep. 28, 2021

(54) PNEUMATIC TIRE AND METHOD FOR PRODUCING SAME

(71) Applicant: SUMITOMO RUBBER INDUSTRIES, LTD., Kobe (JP)

(72) Inventors: Naoki Yukawa, Kobe (JP); Satoshi Yamada, Kobe (JP); Mutsuki Sugimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 1031 days.

(21) Appl. No.: 15/516,546

(22) PCT Filed: Oct. 16, 2015

(86) PCT No.: PCT/JP2015/079312
§ 371 (c)(1),
(2) Date: Apr. 3, 2017

(87) PCT Pub. No.: WO2016/060247
PCT Pub. Date: Apr. 21, 2016

(65) Prior Publication Data
US 2017/0291379 A1    Oct. 12, 2017

(30) Foreign Application Priority Data

Oct. 17, 2014    (JP) .............................. JP2014-212950
Dec. 1, 2014    (JP) .............................. JP2014-243397

(51) Int. Cl.
*B60C 19/12*    (2006.01)
*B29D 30/06*    (2006.01)

(52) U.S. Cl.
CPC .......... *B29D 30/0685* (2013.01); *B60C 19/12* (2013.01); *B29D 2030/0682* (2013.01);
(Continued)

(58) Field of Classification Search
CPC ....... B60C 19/12; B60C 19/122; B29C 73/16; B29C 73/163; B29C 73/166; B29C 73/18;
(Continued)

(56) References Cited

U.S. PATENT DOCUMENTS

| 4,115,172 A | 9/1978 | Baboff et al. |
| 4,359,078 A * | 11/1982 | Egan ....................... B60C 19/12 152/504 |

(Continued)

FOREIGN PATENT DOCUMENTS

| CN | 1464849 A | 12/2003 |
| CN | 101003186 A | 7/2007 |

(Continued)

OTHER PUBLICATIONS

International Search Report issued in PCT/JP2015/079312 (PCT/ISA/210), dated Jan. 12, 2016.
(Continued)

*Primary Examiner* — Adrienne C. Johnstone
(74) *Attorney, Agent, or Firm* — Birch, Stewart, Kolasch & Birch LLP

(57) ABSTRACT

A pneumatic tire and a method for producing the pneumatic tire, wherein the pneumatic tire includes a generally string-shaped adhesive sealant, the sealant is continuously and spirally attached at least to the inner periphery of the tire that corresponds to a tread portion, the sealant has a wider portion on at least one of the longitudinal ends thereof, and the wider portion has a width larger than that of the longitudinally adjoining portion.

7 Claims, 6 Drawing Sheets

(52) U.S. Cl.
CPC ............. *B29D 2030/0694* (2013.01); *Y10T 152/10684* (2015.01)

(58) Field of Classification Search
CPC ....... Y10T 152/10666–10693; B29D 30/0685; B29D 30/0681; B29D 2030/0694; B29D 2030/0686; B29D 2030/0685; B29D 2030/0682
USPC .................................. 152/502–505; 156/115
See application file for complete search history.

(56) References Cited

U.S. PATENT DOCUMENTS

| | | | |
|---|---|---|---|
| 4,398,583 A | | 8/1983 | Casey |
| 4,664,168 A | * | 5/1987 | Hong ................ B29D 30/0685 152/504 |
| 5,711,904 A | | 1/1998 | Eswaran et al. |
| 6,194,485 B1 | | 2/2001 | Hogan et al. |
| 2003/0155058 A1 | | 8/2003 | Saito |
| 2004/0194862 A1 | * | 10/2004 | Fukutomi ............. B29C 73/163 156/115 |
| 2010/0218883 A1 | | 9/2010 | Naito |
| 2014/0014248 A1 | | 1/2014 | Parfondry et al. |
| 2015/0107743 A1 | | 4/2015 | Seong |
| 2017/0080655 A1 | * | 3/2017 | Barjon ................. B29C 73/166 |

FOREIGN PATENT DOCUMENTS

| | | |
|---|---|---|
| CN | 101935413 A | 1/2011 |
| EP | 0080968 A2 | 6/1983 |
| EP | 0302400 A1 | 2/1989 |
| JP | 50-27067 A | 3/1975 |
| JP | 52-145904 A | 12/1977 |
| JP | 52-148544 A | 12/1977 |
| JP | 53-16203 A | 2/1978 |
| JP | 53-60002 A | 5/1978 |
| JP | 53-138111 A | 12/1978 |
| JP | 54-9805 A | 1/1979 |
| JP | 55-37322 A | 3/1980 |
| JP | 55-127212 A | 10/1980 |
| JP | 56-34509 A | 4/1981 |
| JP | 57-42753 A | 3/1982 |
| JP | 58-93612 A | 6/1983 |
| JP | 59-15442 A | 1/1984 |
| JP | 1-113483 A | 5/1989 |
| JP | 4-226741 A | 8/1992 |
| JP | 6-183207 A | 7/1994 |
| JP | 9155950 A | 6/1997 |
| JP | 11-291363 A | 10/1999 |
| JP | 2001-18609 A | 1/2001 |
| JP | 2002-36813 A | 2/2002 |
| JP | 2002-205512 A | 7/2002 |
| JP | 2002-347136 A | 12/2002 |
| JP | 2002-347418 A | 12/2002 |
| JP | 2003-512478 A | 4/2003 |
| JP | 2003-305781 A | 10/2003 |
| JP | 2004-168212 A | 6/2004 |
| JP | 2004-299379 A | 10/2004 |
| JP | 2005-254551 A | 9/2005 |
| JP | 2005-528272 A | 9/2005 |
| JP | 2006-181566 A | 7/2006 |
| JP | 2007-76290 A | 3/2007 |
| JP | 2007-99162 A | 4/2007 |
| JP | 2008-500915 A | 1/2008 |
| JP | 2008-149714 A | 7/2008 |
| JP | 2008-213418 A | 9/2008 |
| JP | 2008-255168 A | 10/2008 |
| JP | 2008-307749 A | 12/2008 |
| JP | 2009-191106 A | 8/2009 |
| JP | 2010-42695 A | 2/2010 |
| JP | 2010-528131 A | 8/2010 |
| JP | 2010-234707 A | 10/2010 |
| JP | 2010-280340 A | 12/2010 |
| JP | 2011-20479 A | 2/2011 |
| JP | 2011-143680 A | 7/2011 |
| JP | 2012-183656 A | 9/2012 |
| JP | 2013-43643 A | 3/2013 |
| JP | 2013-147243 A | 8/2013 |
| KR | 10-1430052 B1 | 8/2014 |
| WO | WO 03/101709 A1 | 12/2003 |
| WO | WO 2009/014082 A1 | 1/2009 |
| WO | WO 2012/090311 A1 | 7/2012 |
| WO | WO-2014/057387 A2 * | 4/2014 |
| WO | WO-2015/173120 A1 * | 11/2015 |

OTHER PUBLICATIONS

Written Opinion of the International Searching Authority issued in PCT/JP2015/079312 (PCT/ISA/237), dated Jan. 12, 2016.
Machine Translation of JP-2011-143680-A, published Jul. 28, 2011 (Japanese and English language versions provided).
Machine Translation of JP-54-9805-A, published Jan. 25, 1979 (Japanese and English language versions provided).

* cited by examiner

--PRIOR ART--

PNEUMATIC TIRE AND METHOD FOR PRODUCING SAME

TECHNICAL FIELD

The present invention relates to a pneumatic tire and a method for producing the pneumatic tire.

BACKGROUND ART

Self-sealing tires with sealants applied to the inner peripheries thereof have been known as puncture resistant pneumatic tires (hereinafter, pneumatic tires are also referred to simply as tires). Sealants automatically seal puncture holes formed in such self-sealing tires.

Self-sealing tires may be produced by spraying an adhesive sealant onto the inner periphery of a tire or by circumferentially spirally attaching a generally string-shaped adhesive sealant to the inner periphery of a tire. Among these, the latter method is considered to be advantageous for preventing the deterioration of tire uniformity and providing better weight balance.

However, since the generally string-shaped sealant has a certain degree of viscosity to avoid flowing, it may show insufficient adhesion. Unfortunately, such a sealant may be difficult to attach to the inner periphery of a tire, and particularly the attachment start portion of the sealant can easily peel off.

SUMMARY OF INVENTION

Technical Problem

The present invention aims to solve the above problems and provide a pneumatic tire (self-sealing tire) in which the attachment start portion of the sealant does not easily peel off, and a method for producing the self-sealing tire.

Solution to Problem

The present invention relates to a pneumatic tire (self-sealing tire), including a generally string-shaped adhesive sealant, the sealant being continuously and spirally attached at least to an inner periphery of the tire that corresponds to a tread portion, the sealant having a wider portion at at least one of longitudinal ends thereof, the wider portion having a width larger than that of a longitudinally adjoining portion.

The width of the wider portion is preferably 103% to 180% of a width of the sealant other than the wider portion.

The sealant other than the wider portion preferably has a width of 1.3 to 13 mm.

The sealant other than the wider portion preferably has a substantially constant width.

The wider portion of the sealant preferably has a length shorter than 500 mm.

An area where the sealant is attached preferably has a width that is 80% to 120% of a tread contact width.

The sealant preferably has a thickness of 1 to 10 mm.

The present invention also relates to a method for producing a pneumatic tire (self-sealing tire), the method including discharging a generally string-shaped adhesive sealant from a nozzle to continuously and spirally attach the sealant at least to an inner periphery of a tire that corresponds to a tread portion, the sealant being attached under conditions where a distance between the inner periphery of the tire and a tip of the nozzle is adjusted to a distance $d_1$ and then to a distance $d_2$ larger than the distance $d_1$ so that at least one of longitudinal ends of the sealant forms a wider portion having a width larger than that of a longitudinally adjoining portion.

The sealant is preferably extruded from a twin screw kneading extruder and fed to the nozzle.

ADVANTAGEOUS EFFECTS OF INVENTION

In the pneumatic tire (self-sealing tire) of the present invention, a portion of the sealant that corresponds to starting of attachment is wider to prevent peeling of this portion of the sealant. In the method for producing a self-sealing tire of the present invention, the distance between the inner periphery of a tire and the tip of the nozzle is shortened at the beginning of the attachment to allow the self-sealing tire to be easily produced.

DESCRIPTION OF EMBODIMENTS

Figure 1:
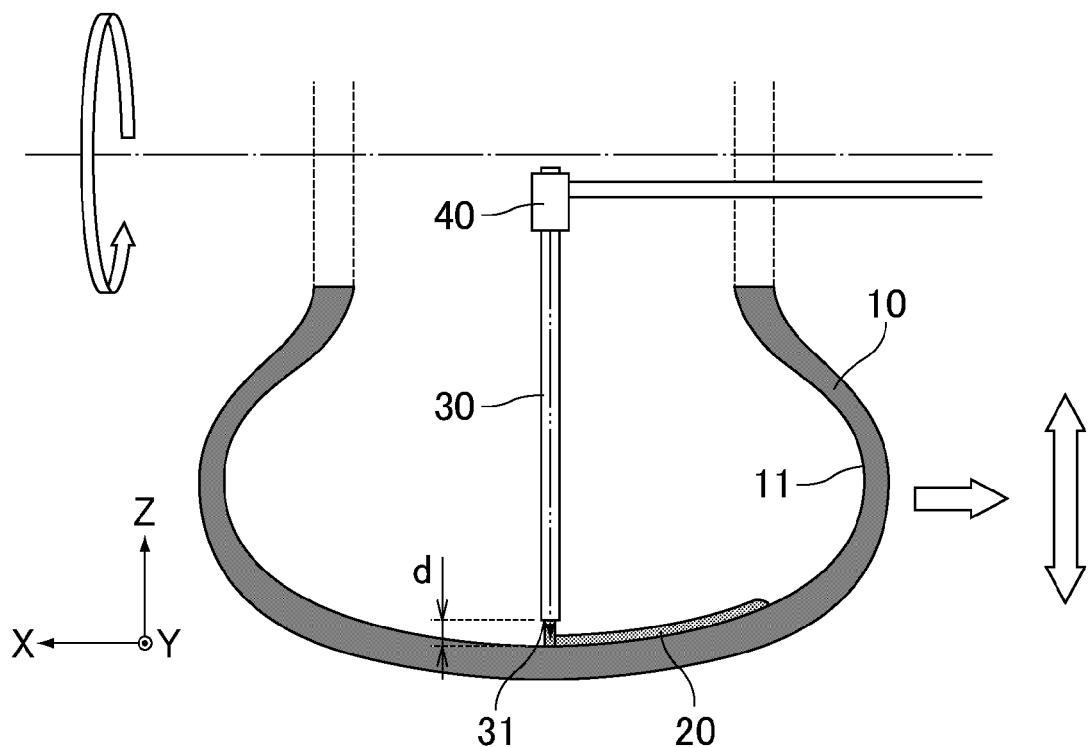
FIG. 1 is an explanatory view schematically showing an example of an applicator used in a method for producing a self-sealing tire.

The pneumatic tire (self-sealing tire) of the present invention is characterized by including a generally string-shaped adhesive sealant, wherein the sealant is continuously and spirally attached at least to the inner periphery of the tire that corresponds to a tread portion, the sealant has a wider portion at at least one of the longitudinal ends thereof, and the wider portion has a width larger than that of the longitudinally adjoining portion.

In the self-sealing tire of the present invention, a portion of the sealant that corresponds to starting of attachment has a larger width to improve adhesion of this portion so that peeling of this portion of the sealant can be prevented.

The method for producing a self-sealing tire of the present invention is intended to produce the above self-sealing tire and is characterized by attaching a sealant under conditions where the distance between the inner periphery of a tire and the tip of the nozzle is adjusted to a distance $d_1$ and then to a distance $d_2$ larger than the distance $d_1$.

In the method for producing a self-sealing tire of the present invention, the distance between the inner periphery of a tire and the tip of the nozzle is shortened at the beginning of the attachment, so that the width of the sealant corresponding to the attachment start portion can be increased to allow the self-sealing tire to be easily produced.

First, suitable examples of the method for producing a self-sealing tire of the present invention (see particularly the second embodiment) will be described.

The following describes suitable examples of the method for producing a self-sealing tire of the present invention.

A self-sealing tire can be produced, for example, by preparing a sealant by mixing the components of the sealant, and then attaching the sealant to the inner periphery of a tire by application or other means to form a sealant layer. The self-sealing tire includes the sealant layer located radially inside an innerliner.

The hardness (viscosity) of the sealant needs to be adjusted to an appropriate viscosity according to the service temperature by controlling the rubber component and the degree of crosslinking. The rubber component is controlled by varying the type and amount of liquid rubber, plasticizers, or carbon black, while the degree of crosslinking is controlled by varying the type and amount of crosslinking agents or crosslinking activators.

Any sealant that shows adhesion may be used, and rubber compositions conventionally used to seal punctures of tires can be used. The rubber component constituting a main ingredient of such a rubber composition may include a butyl-based rubber. Examples of the butyl-based rubber include butyl rubber (IIR) and halogenated butyl rubbers (X-IIR) such as brominated butyl rubber (Br-IIR) and chlorinated butyl rubber (Cl-IIR). In particular, in view of fluidity and other properties, either or both of butyl rubber and halogenated butyl rubbers can be suitably used. The butyl-based rubber to be used is preferably in the form of pellets. Such a pelletized butyl-based rubber can be precisely and suitably supplied to a continuous kneader so that the sealant can be produced with high productivity.

In order to reduce the deterioration of the fluidity of the sealant, the butyl-based rubber to be used is preferably a butyl-based rubber A having a Mooney viscosity $ML_{1+8}$ at 125° C. of at least 20 but less than 40 and/or a butyl-based rubber B having a Mooney viscosity $ML_{1+8}$ at 125° C. of at least 40 but not more than 80. It is particularly suitable to use at least the butyl-based rubber A. When the butyl-based rubbers A and B are used in combination, the blending ratio may be appropriately chosen.

The Mooney viscosity $ML_{1+8}$ at 125° C. of the butyl-based rubber A is more preferably 25 or more, still more preferably 28 or more, but more preferably 38 or less, still more preferably 35 or less. If the Mooney viscosity is less than 20, the fluidity may be reduced. If the Mooney viscosity is 40 or more, the effect of the combined use may not be achieved.

The Mooney viscosity $ML_{1+8}$ at 125° C. of the butyl-based rubber B is more preferably 45 or more, still more preferably 48 or more, but more preferably 70 or less, still more preferably 60 or less. If the Mooney viscosity is less than 40, the effect of the combined use may not be achieved. If the Mooney viscosity is more than 80, sealing performance may be reduced.

The Mooney viscosity $ML_{1+8}$ at 125° C. is determined in conformity with JIS K-6300-1:2001 ata test temperature of 125° C. using an L type rotor with a preheating time of one minute and a rotation time of eight minutes.

The rubber component may be a combination with other ingredients such as diene rubbers, including natural rubber (NR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), acrylonitrile-butadiene rubber (NBR), and butyl rubber (IIR). In view of fluidity and other properties, the amount of the butyl-based rubber based on 100% by mass of the rubber component is preferably 90% by mass or more, more preferably 95% by mass or more, particularly preferably 100% by mass.

Examples of the liquid polymer used in the sealant include liquid polybutene, liquid polyisobutene, liquid polyisoprene, liquid polybutadiene, liquid poly-α-olefin, liquid isobutylene, liquid ethylene-α-olefin copolymers, liquid ethylene-propylene copolymers, and liquid ethylene-butylene copolymers. In order to provide adhesion and other properties, liquid polybutene is preferred among these. Examples of the liquid polybutene include copolymers having a long-chain hydrocarbon molecular structure which is based on isobutene and further reacted with normal butene. Hydrogenated liquid polybutene may also be used.

In order to prevent the sealant from flowing during high-speed running, the liquid polymer (e.g. liquidpolybutene) to be used is preferably a liquid polymer A having a kinematic viscosity at 100° C. of 550 to 625 $mm^2/s$ and/or a liquid polymer B having a kinematic viscosity at 100° C. of 3,540 to 4,010 $mm^2/s$, more preferably a combination of the liquid polymers A and B.

The kinematic viscosity at 100° C. of the liquid polymer A (e.g. liquid polybutene) is preferably 550 $mm^2/s$ or higher, more preferably 570 $mm^2/s$ or higher. If the kinematic viscosity is lower than 550 $mm^2/s$, flowing of the sealant may occur. The kinematic viscosity at 100° C. is preferably 625 $mm^2/s$ or lower, more preferably 610 $mm^2/s$ or lower. If the kinematic viscosity is higher than 625 $mm^2/s$, the sealant may have higher viscosity and deteriorated extrudability.

The kinematic viscosity at 100° C. of the liquid polymer B (e.g. liquid polybutene) is preferably 3,600 $mm^2/s$ or higher, more preferably 3,650 $mm^2/s$ or higher. If the kinematic viscosity is lower than 3,540 $mm^2/s$, the sealant may have too low a viscosity and easily flow during service of the tire, resulting in deterioration of sealing performance or uniformity.

The kinematic viscosity at 100° C. is preferably 3,900 $mm^2/s$ or lower, more preferably 3,800 $mm^2/s$ or lower. If the kinematic viscosity is higher than 4,010 $mm^2/s$, sealing performance may deteriorate.

The kinematic viscosity at 40° C. of the liquid polymer A (e.g. liquid polybutene) is preferably 20,000 $mm^2/s$ or higher, more preferably 23,000 $mm^2/s$ or higher. If the kinematic viscosity is lower than 20,000 $mm^2/s$, the sealant may be soft so that its flowing can occur. The kinematic viscosity at 40° C. is preferably 30,000 $mm^2/s$ or lower, more preferably 28,000 $mm^2/s$ or lower. If the kinematic viscosity is higher than 30,000 $mm^2/s$, the sealant may have too high a viscosity and deteriorated sealing performance.

The kinematic viscosity at 40° C. of the liquid polymer B (e.g. liquid polybutene) is preferably 120,000 $mm^2/s$ or higher, more preferably 150,000 $mm^2/s$ or higher. If the kinematic viscosity is lower than 120,000 $mm^2/s$, the sealant may have too low a viscosity and easily flow during service of the tire, resulting in deterioration of sealing performance or uniformity. The kinematic viscosity at 40° C. is preferably 200,000 $mm^2/s$ or lower, more preferably 170,000$=^2$/s or lower. If the kinematic viscosity is higher than 200,000 $mm^2/s$, the sealant may have too high a viscosity and deteriorated sealing performance.

The kinematic viscosity is determined in conformity with JIS K 2283-2000 at 100° C. or 40° C.

The amount of the liquid polymer (the combined amount of the liquid polymers A and B and other liquid polymers) relative to 100 parts by mass of the rubber component is preferably 50 parts by mass or more, more preferably 100 parts by mass or more, still more preferably 150 parts by mass or more. If the amount is less than 50 parts by mass, adhesion may be reduced. The amount is preferably 400 parts by mass or less, more preferably 300 parts by mass or less, still more preferably 250 parts by mass or less. If the amount is more than 400 parts by mass, flowing of the sealant may occur.

In the case where the liquid polymers A and B are used in combination, the blending ratio of these polymers [(amount of liquid polymer A)/(amount of liquid polymer B)] is preferably 10/90 to 90/10, more preferably 30/70 to 70/30, still more preferably 40/60 to 60/40. When the blending ratio is within the range indicated above, the sealant is provided with good adhesion.

The organic peroxide (crosslinking agent) is not particularly limited, and conventionally known compounds can be used. The use of a butyl-based rubber and a liquid polymer in an organic peroxide crosslinking system improves adhesion, sealing performance, fluidity, and processability.

Examples of the organic peroxide include acyl peroxides such as benzoyl peroxide, dibenzoyl peroxide, and p-chlorobenzoyl peroxide; peroxyesters such as 1-butyl peroxyacetate, t-butyl peroxybenzoate, and t-butyl peroxyphthalate; ketone peroxides such as methyl ethyl ketone peroxide; alkyl peroxides such as di-t-butyl peroxybenzoate and 1,3-bis (1-butylperoxyisopropyl)benzene; hydroperoxides such as t-butyl hydroperoxide; and dicumyl peroxide and t-butylcumyl peroxide. In view of adhesion and fluidity, acyl peroxides are preferred among these, with dibenzoyl peroxide being particularly preferred. Moreover, the organic peroxide (crosslinking agent) to be used is preferably in the form of powder. Such a powdered organic peroxide (crosslinking agent) can be precisely and suitably supplied to a continuous kneader so that the sealant can be produced with high productivity.

The amount of the organic peroxide (crosslinking agent) relative to 100 parts by mass of the rubber component is preferably 0.5 parts by mass or more, more preferably 1 part by mass or more, still more preferably 5 parts by mass or more. If the amount is less than 0.5 parts by mass, crosslink density may decrease so that flowing of the sealant can occur. The amount is preferably 40 parts by mass or less, more preferably 20 parts by mass or less, still more preferably 15 parts by mass or less. If the amount is more than 40 parts by mass, crosslink density may increase so that the sealant can be hardened and show reduced sealing performance.

The crosslinking activator (vulcanization accelerator) to be used may be at least one selected from the group consisting of sulfenamide crosslinking activators, thiazole crosslinking activators, thiuram crosslinking activators, thiourea crosslinking activators, guanidine crosslinking activators, dithiocarbamate crosslinking activators, aldehyde-amine crosslinking activators, aldehyde-ammonia crosslinking activators, imidazoline crosslinking activators, xanthate crosslinking activators, and quinone dioxime compounds (quinoid compounds). For example, quinone dioxime compounds (quinoid compounds) can be suitably used. The use of a butyl-based rubber and a liquid polymer in a crosslinking system including a crosslinking activator added to an organic peroxide improves adhesion, sealing performance, fluidity, and processability.

Examples of the quinone dioxime compound include p-benzoquinone dioxime, p-quinone dioxime, p-quinone dioxime diacetate, p-quinone dioxime dicaproate, p-quinone dioxime dilaurate, p-quinone dioxime distearate, p-quinone dioxime dicrotonate, p-quinone dioxime dinaphthenate, p-quinone dioxime succinate, p-quinone dioxime adipate, p-quinone dioxime difuroate, p-quinone dioxime dibenzoate, p-quinone dioxime di(o-chlorobenzoate), p-quinone dioxime di(p-chlorobenzoate), p-quinone dioxime di(p-nitrobenzoate), p-quinone dioxime di(m-nitrobenzoate), p-quinone dioxime di(3,5-dinitrobenzoate), p-quinone dioxime di(p-methoxybenzoate), p-quinone dioxime di(n-amyloxybenzoate), and p-quinone dioxime di(m-bromobenzoate). In view of adhesion, sealing performance, and fluidity, p-benzoquinone dioxime is preferred among these. Moreover, the crosslinking activator (vulcanization accelerator) to be used is preferably in the form of powder. Such a powdered crosslinking activator (vulcanization accelerator) can be precisely and suitably supplied to a continuous kneader so that the sealant can be produced with high productivity.

The amount of the crosslinking activator (e.g. quinone dioxime compounds) relative to 100 parts by mass of the rubber component is preferably 0.5 parts by mass or more, more preferably 1 part by mass or more, still more preferably 3 parts by mass or more. If the amount is less than 0.5 parts by mass, flowing of the sealant may occur. The amount is preferably 40 parts by mass or less, more preferably 20 parts by mass or less, still more preferably 15 parts by mass or less. If the amount is more than 40 parts by mass, sealing performance may be reduced.

The sealant may further contain an inorganic filler such as carbon black, silica, calcium carbonate, calcium silicate, magnesium oxide, aluminum oxide, barium sulfate, talc, or mica; or a plasticizer such as aromatic process oils, naphthenic process oils, or paraffinic process oils.

The amount of the inorganic filler relative to 100 parts by mass of the rubber component is preferably 1 part by mass or more, more preferably 10 parts by mass or more. If the amount is less than 1 part by mass, sealing performance may be reduced due to degradation by ultraviolet rays. The amount is preferably 50 parts by mass or less, more preferably 40 parts by mass or less, still more preferably 30 parts by mass or less. If the amount is more than 50 parts by mass, the sealant may have too high a viscosity and deteriorated sealing performance.

In order to prevent degradation by ultraviolet rays, the inorganic filler is preferably carbon black. In this case, the amount of the carbon black relative to 100 parts by mass of the rubber component is preferably 1 part by mass or more, more preferably 10 parts by mass or more. If the amount is less than 1 part by mass, sealing performance may be reduced due to degradation by ultraviolet rays. The amount is preferably 50 parts by mass or less, more preferably 40 parts by mass or less, still more preferably 25 parts by mass or less. If the amount is more than 50 parts by mass, the sealant may have too high a viscosity and deteriorated sealing performance.

The amount of the plasticizer relative to 100 parts by mass of the rubber component is preferably 1 part by mass or more, more preferably 5 parts by mass or more. If the amount is less than 1 part by mass, the sealant may show lower adhesion to tires, failing to have sufficient sealing performance. The amount is preferably 40 parts by mass or less, more preferably 20 parts by mass or less. If the amount is more than 40 parts by mass, the sealant may slide in the kneader so that it cannot be easily kneaded.

The sealant is preferably prepared by mixing a pelletized butyl-based rubber, a powdered crosslinking agent, and a powdered crosslinking activator, and more preferably by mixing a pelletized butyl-based rubber, a liquid polybutene, a plasticizer, carbon black powder, a powdered crosslinking agent, and a powdered crosslinking activator. Such raw materials can be suitably supplied to a continuous kneader so that the sealant can be produced with high productivity.

The sealant is preferably obtained by incorporating a rubber component including butyl rubber with predetermined amounts of a liquid polymer, an organic peroxide, and a crosslinking activator.

A sealant obtained by incorporating butyl rubber with a liquid polymer such as liquid polybutene, especially wherein the butyl rubber and the liquid polymer are each a combination of two or more materials having different viscosities, can achieve a balanced improvement in adhesion, sealing performance, fluidity, and processability. This is because the introduction of a liquid polymer component to an organic peroxide crosslinking system using butyl rubber as the rubber component provides adhesion, and especially the use of liquid polymers or solid butyl rubbers having different viscosities reduces flowing of the sealant during high-speed running. Therefore, the sealant can achieve a balanced improvement in adhesion, sealing performance, fluidity, and processability.

The viscosity at 40° C. of the sealant is not particularly limited. In order to allow the sealant to suitably maintain a generally string shape when it is applied to the inner periphery of a tire, and in view of adhesion, fluidity, and other properties, the viscosity at 40° C. is preferably 3,000 Pa·s or higher, more preferably 5,000 Pa·s or higher, but preferably 70,000 Pa·s or lower, more preferably 50,000 Pa·s or lower. If the viscosity is lower than 3,000 Pa·s, the applied sealant may flow when the tire stops rotating, so that the sealant cannot maintain the film thickness. Also, if the viscosity is higher than 70,000 Pa·s, the sealant cannot be easily discharged from the nozzle.

The viscosity of the sealant is determined at 40° C. in conformity with JIS K 6833 using a rotational viscometer.

A self-sealing tire including a sealant layer located radially inside an innerliner can be produced by preparing a sealant by mixing the aforementioned materials, and applying the sealant to the inner periphery of a tire, and preferably to the radially inner face of an innerliner. The materials of the sealant may be mixed using known continuous kneaders, for example. In particular, they are preferably mixed using a co-rotating or counter-rotating multi-screw kneading extruder, and especially a twin screw kneading extruder.

The continuous kneader (especially twin screw kneading extruder) preferably has a plurality of supply ports for supplying raw materials, more preferably at least three supply ports, still more preferably at least three supply ports including upstream, midstream, and downstream supply ports. By sequentially supplying the raw materials to the continuous kneader (especially twin screw kneading extruder), the raw materials are mixed and sequentially and continuously prepared into a sealant.

Preferably, the raw materials are sequentially supplied to the continuous kneader (especially twin screw kneading extruder), starting from the material having a higher viscosity. In this case, the materials can be sufficiently mixed and prepared into a sealant of a consistent quality. Moreover, powder materials, which improve kneadability, should be introduced as upstream as possible.

The organic peroxide is preferably supplied to the continuous kneader (especially twin screw kneading extruder) through its downstream supply port. In this case, the time period from supplying the organic peroxide to applying the sealant to a tire can be shortened so that the sealant can be applied to a tire before it is cured. This allows for more stable production of self-sealing tires.

Since kneading is unsuccessfully accomplished when a large amount of the liquid polymer is introduced at once into the continuous kneader (especially twin screw kneading extruder), the liquid polymer is preferably supplied to the continuous kneader (especially twin screw kneading extruder) through a plurality of supply ports. In this case, the sealant can be more suitably kneaded.

When a continuous kneader (especially twin screw kneading extruder) is used, the sealant is preferably prepared using the continuous kneader (especially twin screw kneading extruder) having at least three supply ports by supplying a rubber component such as a butyl-based rubber, an inorganic filler, and a crosslinking activator each from an upstream supply port, a liquid polymer B from a midstream supply port, and a liquid polymer A, an organic peroxide, and a plasticizer each from a downstream supply port of the continuous kneader (especially twin screw kneading extruder), followed by kneading and extrusion. The materials such as liquid polymers may be entirely or partly supplied from the respective supply ports. Preferably, 95% by mass or more of the entire amount of each material is supplied from the supply port.

Preferably, all the raw materials to be introduced into the continuous kneader are introduced into the continuous kneader under the control of a quantitative feeder. This allows for continuous and automated preparation of the sealant.

Any feeder that can provide quantitative feeding may be used, including known feeders such as screw feeders, plunger pumps, gear pumps, and mohno pumps.

Solid raw materials (especially pellets or powder) such as pelletized butyl-based rubbers, carbon black powder, powdered crosslinking agents, and powdered crosslinking activators are preferably quantitatively supplied using a screw feeder. This allows the solid raw materials to be supplied precisely in fixed amounts, thereby leading to the production of a higher quality sealant and therefore a higher quality self-sealing tire.

Moreover, the solid raw materials are preferably individually supplied through separate respective feeders. In this case, the raw materials need not to be blended beforehand, which facilitates supply of the materials in the mass production.

The plasticizer is preferably quantitatively supplied using a plunger pump. This allows the plasticizer to be supplied precisely in a fixed amount, thereby leading to the production of a higher quality sealant and therefore a higher quality self-sealing tire.

The liquid polymer is preferably quantitatively supplied using a gear pump. This allows the liquid polymer to be supplied precisely in a fixed amount, thereby leading to the production of a higher quality sealant and therefore a higher quality self-sealing tire.

The liquid polymer to be supplied is preferably kept under constant temperature control. The constant temperature control allows the liquid polymer to be supplied more precisely in a fixed amount. The liquid polymer to be supplied preferably has a temperature of 20° C. to 90° C., more preferably 40° C. to 70° C.

In view of easy mixing and extrudability, the mixing in the continuous kneader (especially twin screw kneading extruder) is preferably carried out at a barrel temperature of 30° C. (preferably 50° C.) to 150° C.

In view of sufficient mixing, preferably, the materials supplied upstream are mixed for 1 to 3 minutes, and the materials supplied midstream are mixed for 1 to 3 minutes, while the materials supplied downstream are preferably mixed for 0.5 to 2 minutes in order to avoid crosslinking. The times for mixing the materials each refer to the residence time in the continuous kneader (especially twin screw kneading extruder) from supply to discharge. For example, the time for mixing the materials supplied downstream means the residence time from when they are supplied through a downstream supply port until they are discharged.

By varying the screw rotational speed of the continuous kneader (especially twin screw kneading extruder) or the setting of a temperature controller, the temperature of the sealant discharged from the outlet can be controlled and therefore the rate of curing acceleration of the sealant can be controlled. As the screw rotational speed of the continuous kneader (especially twin screw kneading extruder) increases, kneadability and material temperature increase. The screw rotational speed does not affect the discharge amount. In view of sufficient mixing and control of the rate of curing acceleration, the screw rotational speed is preferably 50 to 700 (preferably 550) rpm.

In view of sufficient mixing and control of the rate of curing acceleration, the temperature of the sealant discharged from the outlet of the continuous kneader (especially twin screw kneading extruder) is preferably 70° C. to 150° C., more preferably 90° C. to 130° C. When the temperature of the sealant is within the range indicated above, the crosslinking reaction begins upon the application of the sealant and the sealant adheres well to the inner periphery of a tire and, at the same time, the crosslinking reaction more suitably proceeds, whereby a self-sealing tire having high sealing performance can be produced. Moreover, the crosslinking step described later is not required in this case.

The amount of the sealant discharged from the outlet of the continuous kneader (especially twin screw kneading extruder) is determined according to the amounts of the raw materials supplied through the supply ports. The amounts of the raw materials supplied through the supply ports are not particularly limited, and a person skilled in the art can appropriately select the amounts. In order to suitably produce a self-sealing tire having much better uniformity and sealing performance, preferably a substantially constant amount (discharge amount) of the sealant is discharged from the outlet.

Herein, the substantially constant discharge amount means that the discharge amount varies within a range of 93% to 107%, preferably 97% to 103%, more preferably 98% to 102%, still more preferably 99% to 101%.

The outlet of the continuous kneader (especially twin screw kneading extruder) is preferably connected to a nozzle. Since the continuous kneader (especially twin screw kneading extruder) can discharge the materials at a high pressure, the prepared sealant can be attached in a thin, generally string shape (bead shape) to a tire by means of a nozzle (preferably a small diameter nozzle creating high resistance) mounted on the outlet. Specifically, by discharging the sealant from a nozzle connected to the outlet of the continuous kneader (especially twin screw kneading extruder) and sequentially applying it to the inner periphery of a tire, the applied sealant has a substantially constant thickness, thereby preventing deterioration of tire uniformity. This leads to the production of a self-sealing tire that is excellent in weight balance. The diameter of the discharge port of the nozzle (nozzle diameter) is not particularly limited but is preferably 0.3 to 10.0 mm, more preferably 0.5 to 8.0 mm, still more preferably 1.5 to 4.5 mm.

Next, for example, the mixed sealant is discharged from the nozzle connected to the outlet of the extruder such as a continuous kneader (especially twin screw kneading extruder) to feed and apply the sealant directly to the inner periphery of a vulcanized tire, whereby a self-sealing tire can be produced. In this case, since the sealant which has been mixed in, for example, a twin screw kneading extruder and in which the crosslinking reaction in the extruder is suppressed is directly applied to the tire inner periphery, the crosslinking reaction of the sealant begins upon the application, and thus the sealant adheres well to the tire inner periphery and, at the same time, the crosslinking reaction suitably proceeds. For this reason, the sealant applied to the tire inner periphery suitably forms a sealant layer while maintaining a generally string shape. Accordingly, the sealant can be applied and processed in a series of steps and therefore productivity is further improved. Moreover, the application of the sealant to the inner periphery of a vulcanized tire further enhances the productivity of self-sealing tires. Furthermore, the sealant discharged from the nozzle connected to the outlet of the continuous kneader (especially twin screw kneading extruder) is preferably sequentially applied directly to the inner periphery of a tire. In this case, since the sealant in which the crosslinking reaction in the continuous kneader (especially twin screw kneading extruder) is suppressed is directly and continuously applied to the tire inner periphery, the crosslinking reaction of the sealant begins upon the application and the sealant adheres well to the tire inner periphery and, at the same time, the crosslinking reaction suitably proceeds, whereby a self-sealing tire that is excellent in weight balance can be produced with higher productivity.

With regard to the application of the sealant to the inner periphery of a tire, the sealant may be applied at least to the inner periphery of a tire that corresponds to a tread portion, and more preferably at least to the inner periphery of a tire that corresponds to a breaker. Omitting the application of the sealant to areas where the sealant is unnecessary further enhances the productivity of self-sealing tires.

Figure 9:
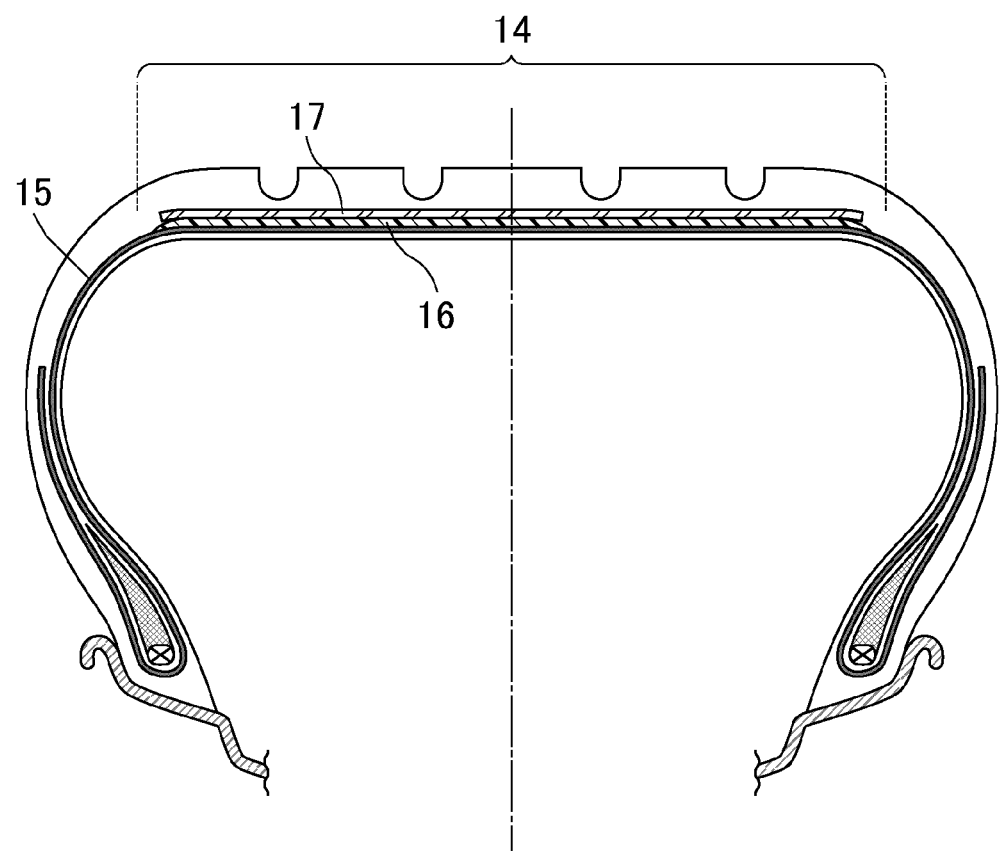
FIG. 9 is an explanatory view schematically showing an example of a cross section of a pneumatic tire.

The inner periphery of a tire that corresponds to a tread portion refers to a portion of the inner periphery of a tire that is located radially inside a tread portion which contacts the road surface. The inner periphery of a tire that corresponds to a breaker refers to a portion of the inner periphery of a tire that is located radially inside a breaker. The breaker refers to a component placed inside a tread and radially outside a carcass. Specifically, it is a component shown as a breaker 16 in FIG. 9, for example.

Unvulcanized tires are usually vulcanized using bladders. During the vulcanization, such a bladder inflates and closely attaches to the inner periphery (innerliner) of the tire. Hence, a mold release agent is usually applied to the inner periphery (innerliner) of the tire to avoid adhesion between the bladder and the inner periphery (innerliner) of the tire after completion of the vulcanization.

The mold release agent is usually a water-soluble paint or a mold-releasing rubber. However, the presence of the mold release agent on the inner periphery of a tire may impair the adhesion between the sealant and the inner periphery of the tire. For this reason, it is preferred to preliminarily remove the mold release agent from the inner periphery of the tire. In particular, the mold release agent is more preferably preliminarily removed at least from a portion of the tire inner periphery in which application of the sealant begins. Still more preferably, the mold release agent is preliminarily removed from the entire area of the tire inner periphery where the sealant is to be applied. In this case, the sealant adheres better to the tire inner periphery and therefore a self-sealing tire having higher sealing performance can be produced.

The mold release agent may be removed from the tire inner periphery by any method, including known methods such as buffing treatment, laser treatment, high pressure water washing, or removal with detergents and preferably with neutral detergents.

Figure 7:
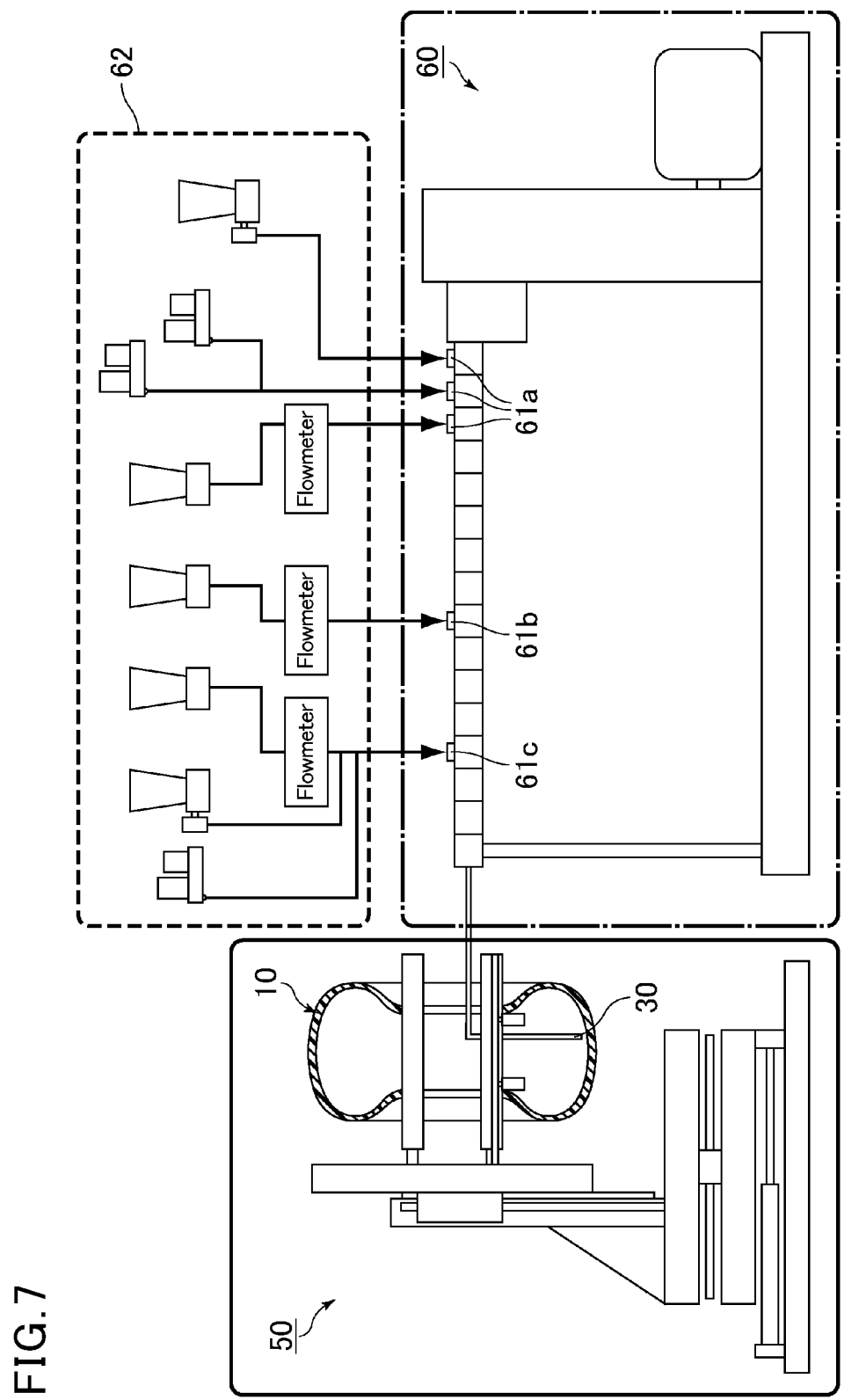
FIG. 7 is an explanatory view schematically showing an example of a production facility used in a method for producing a self-sealing tire.

An example of a production facility used in the method for producing a self-sealing tire will be briefly described below referring to FIG. 7.

The production facility includes a twin screw kneading extruder 60, a material feeder 62 for supplying raw materials to the twin screw kneading extruder 60, and a rotary drive device 50 which fixes and rotates a tire 10 while moving the tire in the width and radial directions of the tire. The twin screw kneading extruder 60 has five supply ports 61, specifically, including three upstream supply ports 61a, one midstream supply port 61b, and one downstream supply port 61c. Further, the outlet of the twin screw kneading extruder 60 is connected to a nozzle 30.

The raw materials are sequentially supplied from the material feeder 62 to the twin screw kneading extruder 60 through the supply ports 61 of the twin screw kneading extruder 60 and then kneaded in the twin screw kneading extruder 60 to sequentially prepare a sealant. The prepared sealant is continuously discharged from the nozzle 30 connected to the outlet of the twin screw kneading extruder 60. The tire is traversed and/or moved up and down (moved in the width direction and/or the radial direction of the tire) while being rotated by the tire drive device, and the sealant discharged from the nozzle 30 is sequentially applied directly to the inner periphery of the tire, whereby the sealant can be continuously and spirally attached to the tire inner periphery. In other words, the sealant can be continuously and spirally attached to the inner periphery of a tire by sequentially applying the sealant continuously discharged from the continuous kneader (especially twin screw kneading extruder) directly to the inner periphery of the tire while rotating and simultaneously moving the tire in the width direction and/or the radial direction of the tire.

Such a continuous and spiral attachment of the sealant to the tire inner periphery can prevent deterioration of tire uniformity, thereby leading to the production of a self-sealing tire that is excellent in weight balance. Moreover, the continuous and spiral attachment of the sealant to the tire inner periphery allows for the formation of a sealant layer in which the sealant is uniformly provided in the circumferential and width directions of the tire, and especially in the circumferential direction of the tire. Thus, self-sealing tires having excellent sealing performance can be stably produced with high productivity. The sealant is preferably attached without overlapping in the width direction, more preferably without gaps. In this case, the deterioration of tire uniformity can be further prevented and a more uniform sealant layer can be formed.

The raw materials are sequentially supplied to a continuous kneader (especially twin screw kneading extruder) which sequentially prepares a sealant. The prepared sealant is continuously discharged from a nozzle connected to the outlet of the continuous kneader (especially twin screw kneading extruder), and the discharged sealant is sequentially applied directly to the inner periphery of a tire. In this manner, self-sealing tires can be produced with high productivity.

The sealant layer is preferably formed by continuously and spirally applying a generally string-shaped sealant to the inner periphery of a tire. In this case, a sealant layer formed of a generally string-shaped sealant provided continuously and spirally along the inner periphery of a tire can be formed on the inner periphery of the tire. The sealant layer may be formed of layers of the sealant, but preferably consists of one layer of the sealant.

In the case of a generally string-shaped sealant, a sealant layer consisting of one layer of the sealant can be formed by continuously and spirally applying the sealant to the inner periphery of a tire. In the case of a generally string-shaped sealant, since the applied sealant has a certain thickness, even a sealant layer consisting of one layer of the sealant can prevent the deterioration of tire uniformity and allow for the production of a self-sealing tire having an excellent weight balance and good sealing performance. Moreover, since it is sufficient to only apply one layer of the sealant without stacking layers of the sealant, a self-sealing tire can be produced with higher productivity.

Figure 4:
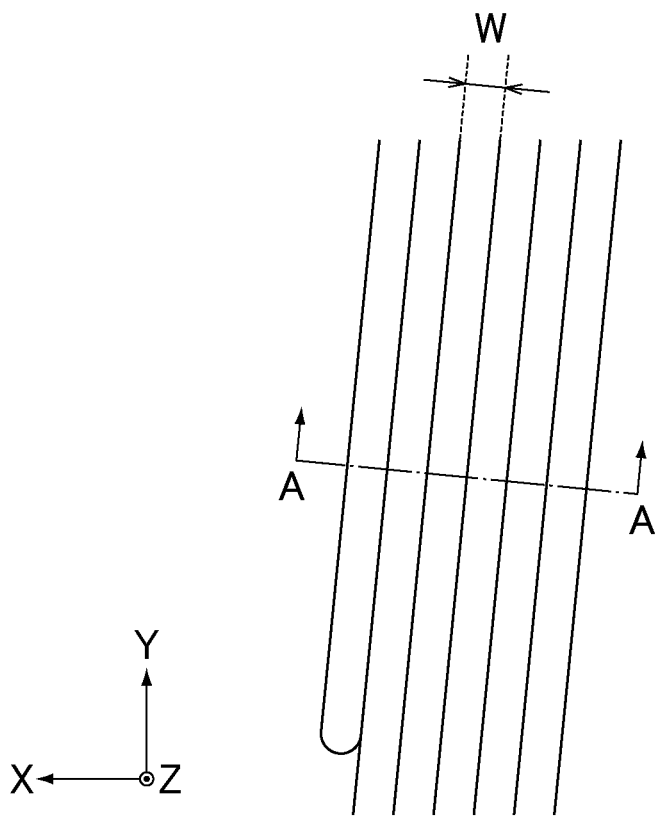
FIG. 4 is an explanatory view schematically showing an example of a generally string-shaped sealant continuously and spirally attached to the inner periphery of the tire.

The number of turns of the sealant around the inner periphery of the tire is preferably 20 to 70, more preferably 20 to 60, still more preferably 35 to 50, because then the deterioration of tire uniformity can be prevented and a self-sealing tire having an excellent weight balance and good sealing performance can be produced with higher productivity. Here, two turns means that the sealant is applied such that it makes two laps around the inner periphery of the tire. In FIG. 4, the number of turns of the sealant is six.

The use of a continuous kneader (especially twin screw kneading extruder) enables the preparation (kneading) of a sealant and the discharge (application) of the sealant to be simultaneously and continuously performed. Thus, a highly viscous and adhesive sealant which is and difficult to handle can be directly applied to the inner periphery of a tire without handling it, so that a self-sealing tire can be produced with high productivity. When a sealant is prepared by kneading with a curing agent in a batch kneader, the time period from preparing a sealant to attaching the sealant to a tire is not constant. In contrast, by sequentially preparing a sealant by mixing raw materials including an organic peroxide using a continuous kneader (especially twin screw kneading extruder), and sequentially applying the sealant to the inner periphery of a tire, the time period from preparing a sealant to attaching the sealant to a tire is held constant. Accordingly, when the sealant is applied through a nozzle, the amount of the sealant discharged from the nozzle is stable; furthermore, the sealant shows consistent adhesion while reducing the deterioration of adhesion to the tire, and even a highly viscous and adhesive sealant which is difficult to handle can be precisely applied to the tire inner periphery. Therefore, self-sealing tires of a consistent quality can be stably produced.

The following describes methods for applying the sealant to the inner periphery of a tire.

First Embodiment

According to a first embodiment, a self-sealing tire can be produced, for example, by performing the Step (1), Step (2), and Step (3) below in the process of applying an adhesive sealant through a nozzle to the inner periphery of a tire while rotating the tire and simultaneously moving at least one of the tire and nozzle in the width direction of the tire: Step (1) of measuring the distance between the inner periphery of the tire and the tip of the nozzle using a non-contact displacement sensor; Step (2) of moving at least one of the tire and nozzle in the radial direction of the tire according to the measurement to adjust the distance between the inner periphery of the tire and the tip of the nozzle to a predetermined length; and Step (3) of applying the sealant to the inner periphery of the tire after the distance is adjusted.

The distance between the inner periphery of the tire and the tip of the nozzle can be maintained at a constant length by measuring the distance between the inner periphery of the tire and the tip of the nozzle using a non-contact displacement sensor and feeding back the measurement. Moreover, since the sealant is applied to the tire inner periphery while maintaining the distance at a constant length, the applied sealant can have a uniform thickness without being affected by variations in tire shape and irregularities at joint portions or the like. Furthermore, since it is not necessary to enter the coordinate data of each tire having a different size as in the conventional art, the sealant can be efficiently applied.

Figure 2:
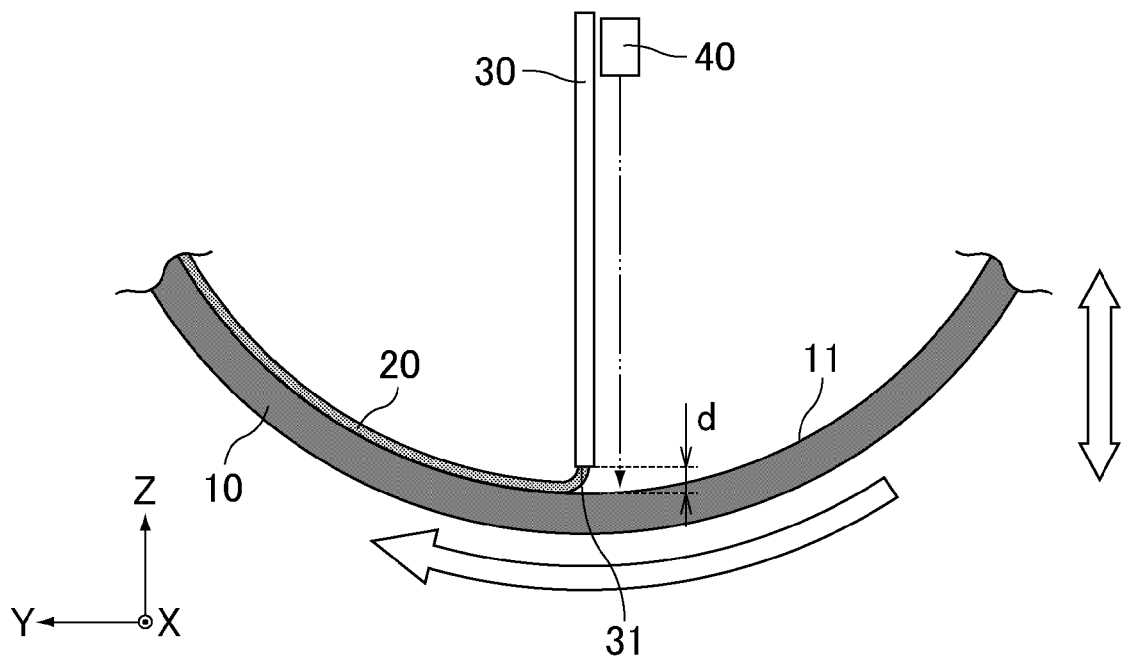
FIG. 2 is an enlarged view showing the vicinity of the tip of the nozzle included in the applicator shown in FIG. 1.

FIG. 1 is an explanatory view schematically showing an example of an applicator used in a method for producing a self-sealing tire, and FIG. 2 is an enlarged view showing the vicinity of the tip of the nozzle included in the applicator shown in FIG. 1.

FIG. 1 shows a cross section of a part of a tire 10 in the meridional direction (a cross section taken along a plane including the width and radial directions of the tire). FIG. 2 shows a cross section of a part of the tire 10 taken along a plane including the circumferential and radial directions of the tire. In FIGS. 1 and 2, the width direction (axis direction) of the tire is indicated by an arrow X, the circumferential direction of the tire is indicated by an arrow Y, and the radial direction of the tire is indicated by an arrow Z.

The tire 10 is mounted on a rotary drive device (not shown) which fixes and rotates a tire while moving the tire in the width and radial directions of the tire. The rotary drive device allows for the following independent operations: rotation around the axis of the tire, movement in the width direction of the tire, and movement in the radial direction of the tire.

The rotary drive device includes a controller (not shown) capable of controlling the amount of movement in the radial direction of the tire. The controller may be capable of controlling the amount of movement in the width direction of the tire and/or the rotational speed of the tire.

A nozzle 30 is attached to the tip of an extruder (not shown) and can be inserted into the inside of the tire 10. Then an adhesive sealant 20 extruded from the extruder is discharged from the tip 31 of the nozzle 30.

A non-contact displacement sensor 40 is attached to the nozzle 30 to measure a distance d between the inner periphery 11 of the tire 10 and the tip 31 of the nozzle 30.

Thus, the distance d to be measured by the non-contact displacement sensor is the distance in the radial direction of the tire between the inner periphery of the tire and the tip of the nozzle.

According to the method for producing a self-sealing tire of this embodiment, the tire 10 formed through a vulcanization step is first mounted on the rotary drive device, and the nozzle 30 is inserted into the inside of the tire 10. Then, as shown in FIG. 1 and FIG. 2, the tire 10 is rotated and simultaneously moved in the width direction while the sealant 20 is discharged from the nozzle 30, whereby the sealant is continuously applied to the inner periphery 11 of the tire 10. The tire 10 is moved in the width direction according to the pre-entered profile of the inner periphery 11 of the tire 10.

The sealant 20 preferably has a generally string shape as described later. More specifically, the sealant preferably maintains a generally string shape when the sealant is applied to the inner periphery of the tire. In this case, the generally string-shaped sealant 20 is continuously and spirally attached to the inner periphery 11 of the tire 10.

Figure 8:
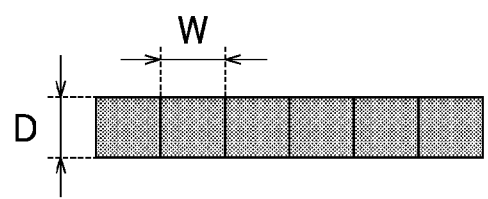
FIG. 8 is an explanatory view schematically showing an example of a cross section of the sealant shown in FIG. 4 when the sealant is cut along the straight line A-A orthogonal to the direction along which the sealant is applied (the longitudinal direction).

The generally string shape as used herein refers to a shape having a certain width, a certain thickness, and a length longer than the width. FIG. 4 schematically shows an example of a generally string-shaped sealant continuously and spirally attached to the inner periphery of the tire, and FIG. 8 schematically shows an example of a cross section of the sealant shown in FIG. 4 when the sealant is cut along the straight line A-A orthogonal to the direction along which the sealant is applied (longitudinal direction). Thus, the generally string-shaped sealant has a certain width (length indicated by W in FIG. 8) and a certain thickness (length indicated by D in FIG. 8). The width of the sealant means the width of the applied sealant. The thickness of the sealant means the thickness of the applied sealant, more specifically the thickness of the sealant layer.

Specifically, the generally string-shaped sealant is a sealant having a thickness (thickness of the applied sealant or the sealant layer, length indicated by D in FIG. 8) satisfying a preferable numerical range and a width (width of the applied sealant, length indicated by W in FIG. 4 or $W_0$ in FIG. 6) satisfying a preferable numerical range as described later, and more preferably a sealant having a ratio of the thickness to the width of the sealant [(thickness of sealant)/(width of sealant)] satisfying a preferable numerical range as described later. The generally string-shaped sealant is also a sealant having a cross-sectional area satisfying a preferable numerical range as described later.

According to the method for producing a self-sealing tire of this embodiment, the sealant is applied to the inner periphery of the tire by the following Steps (1) to (3).

<Step (1)>

As shown in FIG. 2, the distance d between the inner periphery 11 of the tire 10 and the tip 31 of the nozzle 30 is measured with the non-contact displacement sensor 40 before the application of the sealant 20. The distance d is measured for every tire 10 to whose inner periphery 11 is applied the sealant 20, from the start to the end of application of the sealant 20.

<Step (2)>

The distance d data is transmitted to the controller of the rotary drive device. According to the data, the controller controls the amount of movement in the radial direction of the tire so that the distance between the inner periphery 11 of the tire 10 and the tip 31 of the nozzle 30 is adjusted to a predetermined length.

<Step (3)>

Since the sealant 20 is continuously discharged from the tip 31 of the nozzle 30, it is applied to the inner periphery 11 of the tire 10 after the above distance is adjusted. Through the above Steps (1) to (3), the sealant 20 having a uniform thickness can be applied to the inner periphery 11 of the tire 10.

Figure 3:
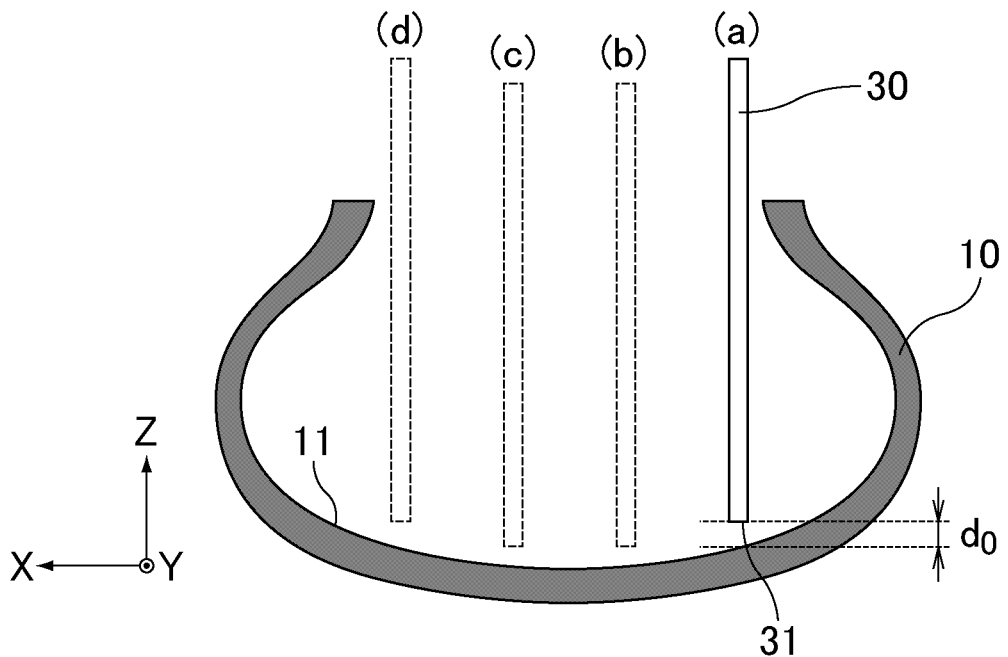
FIG. 3 is an explanatory view schematically showing the positional relationship of the nozzle to the tire.

FIG. 3 is an explanatory view schematically showing the positional relationship of the nozzle to the tire.

As shown in FIG. 3, the sealant can be applied while maintaining the distance between the inner periphery 11 of the tire 10 and the tip 31 of the nozzle 30 at a predetermined distance $d_0$ during the movement of the nozzle 30 to positions (a) to (d) relative to the tire 10.

In order to provide more suitable effects, the controlled distance $d_0$ is preferably 0.3 mm or more, more preferably 1.0 mm or more. If the distance is less than 0.3 mm, the tip of the nozzle is too close to the inner periphery of the tire, which makes it difficult to allow the applied sealant to have a predetermined thickness. The controlled distance $d_0$ is also preferably 3.0 mm or less, more preferably 2.0 mm or less. If the distance is more than 3.0 mm, the sealant may not be attached well to the tire, thereby resulting in reduced production efficiency.

The controlled distance $d_0$ refers to the distance in the radial direction of the tire between the inner periphery of the tire and the tip of the nozzle after the distance is controlled in Step (2).

In order to provide more suitable effects, the controlled distance $d_0$ is preferably 30% or less, more preferably 20% or less of the thickness of the applied sealant. The controlled distance $d_0$ is also preferably 5% or more, more preferably 10% or more of the thickness of the applied sealant.

The thickness of the sealant (thickness of the applied sealant or the sealant layer, length indicated by D in FIG. 8) is not particularly limited. In order to provide more suitable effects, the thickness of the sealant is preferably 1.0 mm or more, more preferably 1.5 mm or more, still more preferably 2.0 mm or more, particularly preferably 2.5 mm or more. Also, the thickness of the sealant is preferably 10 mm or less, more preferably 8.0 mm or less, still more preferably 5.0 mm or less. If the thickness is less than 1.0 mm, a puncture hole formed in the tire is difficult to reliably seal. Also, a thickness of more than 10 mm is not preferred because tire weight increases, although with little improvement in the effect of sealing puncture holes. The thickness of the sealant can be controlled by varying the rotational speed of the tire, the rate of movement in the width direction of the tire, the distance between the tip of the nozzle and the inner periphery of the tire, or other factors.

The sealant preferably has a substantially constant thickness (thickness of the applied sealant or the sealant layer). In this case, the deterioration of tire uniformity can be further prevented and a self-sealing tire having much better weight balance can be produced.

The substantially constant thickness as used herein means that the thickness varies within a range of 90% to 110%, preferably 95% to 105%, more preferably 98% to 102%, still more preferably 99% to 101%.

In order to reduce clogging of the nozzle so that excellent operational stability can be obtained and to provide more suitable effects, a generally string-shaped sealant is preferably used and more preferably spirally attached to the inner periphery of the tire. However, a sealant not having a generally string shape may also be used and applied by spraying onto the tire inner periphery.

In the case of a generally string-shaped sealant, the width of the sealant (the width of the applied sealant, length indicated by W in FIG. 4) is not particularly limited. In order to provide more suitable effects, the width of the sealant is preferably 0.8 mm or more, more preferably 1.3 mm or more, still more preferably 1.5 mm or more. If the width is less than 0.8 mm, the number of turns of the sealant around the tire inner periphery may increase, reducing production efficiency. The width of the sealant is also preferably 18 mm or less, more preferably 13 mm or less, still more preferably 9.0 mm or less, particularly preferably 7.0 mm or less, most preferably 6.0 mm or less, still most preferably 5.0 mm or less. If the width is more than 18 mm, a weight imbalance may be more likely to occur.

The ratio of the thickness of the sealant (thickness of the applied sealant or the sealant layer, length indicated by D in FIG. 8) to the width of the sealant (width of the applied sealant, length indicated by W in FIG. 4) [(thickness of sealant)/(width of sealant)] is preferably 0.6 to 1.4, more preferably 0.7 to 1.3, still more preferably 0.8 to 1.2, particularly preferably 0.9 to 1.1. A ratio closer to 1.0 results in a sealant having an ideal string shape so that a self-sealing tire having high sealing performance can be produced with higher productivity.

In order to provide more suitable effects, the cross-sectional area of the sealant (cross-sectional area of the applied sealant, area calculated by D×W in FIG. 8) is preferably 0.8 mm$^2$ or more, more preferably 1.95 mm$^2$ or more, still more preferably 3.0 mm$^2$ or more, particularly preferably 3.75 mm$^2$ or more, but preferably 180 mm$^2$ or less, more preferably 104 mm$^2$ or less, still more preferably 45 mm$^2$ or less, particularly preferably 35 mm$^2$ or less, most preferably 25 mm$^2$ or less.

The width of the area where the sealant is attached (hereinafter also referred to as the width of the attached area or the width of the sealant layer, and corresponding to a length equal to 6×W in FIG. 4 or a length equal to $W_1+6\times W_0$ in FIG. 6) is not particularly limited. In order to provide more suitable effects, the width is preferably 80% or more, more preferably 90% or more, still more preferably 100% or more, but preferably 120% or less, more preferably 110% or less, of the tread contact width.

In order to provide more suitable effects, the width of the sealant layer is preferably 85% to 115%, more preferably 95% to 105% of the width of the breaker of the tire (the length of the breaker in the width direction of the tire).

Herein, when the tire is provided with a plurality of breakers, the length of the breaker in the width direction of the tire refers to the length of the breaker that is the longest in the width direction of the tire, among the plurality of breakers, in the width direction of the tire.

Herein, the tread contact width is determined as follows. First, a no-load and normal condition tire with a normal internal pressure mounted on a normal rim is contacted with a plane at a camber angle of 0 degrees while a normal load is applied to the tire, and then the axially outermost contact positions of the tire are each defined as "contact edge Te". The distance in the tire axis direction between the contact edges Te and Te is defined as a tread contact width TW. The dimensions and other characteristics of tire components are determined under the above normal conditions, unless otherwise stated.

The "normal rim" refers to a rim specified for each tire by standards in a standard system including standards according to which tires are provided, and may be "standard rim" in JATMA, "design rim" in TRA, or "measuring rim" in ETRTO. Moreover, the "normal internal pressure" refers to an air pressure specified for each tire by standards in a standard system including standards according to which tires are provided, and may be "maximum air pressure" in JATMA, a maximum value shown in Table "TIRE LOAD LIMITS AT VARIOUS COLD INFLATION PRESSURES" in TRA, or "inflation pressure" in ETRTO. In the case of tires for passenger vehicles, the normal internal pressure is 180 kPa.

The "normal load" refers to a load specified for each tire by standards in a standard system including standards according to which tires are provided, and may be "maximum load capacity" in JATMA, a maximum value shown in Table "TIRE LOAD LIMITS AT VARIOUS COLD INFLATION PRESSURES" in TRA, or "load capacity" in ETRTO. In the case of tires for passenger vehicles, the normal load is 88% of the above-specified load.

The rotational speed of the tire during the application of the sealant is not particularly limited. In order to provide more suitable effects, the rotational speed is preferably 5 m/min or higher, more preferably 10 m/min or higher, but preferably 40 m/min or lower, more preferably 30 m/min or lower, still more preferably 20 m/min or lower. If the rotational speed is lower than 5 m/min or higher than 40 m/min, a sealant having a uniform thickness cannot be easily applied.

When a non-contact displacement sensor is used, the risk of troubles caused by adhesion of the sealant to the sensor can be reduced. The non-contact displacement sensor is not particularly limited as long as the sensor can measure the distance between the inner periphery of the tire and the tip of the nozzle. Examples include laser sensors, photosensors, and capacitance sensors. These sensors may be used alone or in combinations of two or more. For measurement of rubber, laser sensors or photosensors are preferred among these, with laser sensors being more preferred. When a laser sensor is used, the distance between the inner periphery of the tire and the tip of the nozzle can be determined as follows: the inner periphery of the tire is irradiated with a laser; the distance between the inner periphery of the tire and the tip of the laser sensor is determined based on the reflection of the laser; and the distance between the tip of the laser sensor and the tip of the nozzle is subtracted from the determined distance.

The location of the non-contact displacement sensor is not particularly limited as long as the distance between the inner periphery of the tire and the tip of the nozzle before the application of the sealant can be measured. The sensor is preferably attached to the nozzle, more preferably in a location to which the sealant will not adhere.

The number, size, and other conditions of the non-contact displacement sensor are also not particularly limited.

Since the non-contact displacement sensor is vulnerable to heat, the sensor is preferably protected with a heat insulator or the like and/or cooled with air or the like to avoid the influence of heat from the hot sealant discharged from the nozzle. This improves the durability of the sensor.

Although the first embodiment has been described based on an example in which the tire, not the nozzle, is moved in the width and radial directions of the tire, the nozzle, not the tire, may be moved, or both the tire and the nozzle may be moved.

The rotary drive device preferably includes a means to increase the width of a tire at a bead portion. In the application of the sealant to a tire, increasing the width of the tire at a bead portion allows the sealant to be easily applied to the tire. Particularly when the nozzle is introduced near the inner periphery of the tire mounted on the rotary drive device, the nozzle can be introduced only by parallel movement of the nozzle, which facilitates the control and improves productivity.

Any means that can increase the width of a tire at a bead portion can be used as the means to increase the width of a tire at a bead portion. Examples include a mechanism in which two devices each having a plurality of (preferably two) rolls which have a fixed positional relationship with each other are used and the devices move in the width direction of the tire. The devices may be inserted from both sides through the opening of the tire into the inside and allowed to increase the width of the tire at a bead portion.

In the production method, since the sealant which has been mixed in, for example, a twin screw kneading extruder and in which the crosslinking reaction in the extruder is suppressed is directly applied to the tire inner periphery, the crosslinking reaction begins upon the application and the sealant adheres well to the tire inner periphery and, at the same time, the crosslinking reaction more suitably proceeds, whereby a self-sealing tire having high sealing performance can be produced. Thus, the self-sealing tire with the sealant applied thereto does not need further crosslinking, thereby offering good productivity.

The self-sealing tire with the sealant applied thereto may be further subjected to a crosslinking step, if necessary.

The self-sealing tire is preferably heated in the crosslinking step. This improves the rate of crosslinking of the sealant and allows the crosslinking reaction to more suitably proceed so that the self-sealing tire can be produced with higher productivity. The tire may be heated by any method, including known methods, but it may suitably be heated in an oven. The crosslinking step may be carried out, for example, by placing the self-sealing tire in an oven at 70° C. to 190° C., preferably 150° C. to 190° C., for 2 to 15 minutes.

The tire is preferably rotated in the circumferential direction of the tire during the crosslinking because then flowing of even the just-applied, easily flowing sealant can be prevented and the crosslinking reaction can be accomplished without deterioration of uniformity. The rotational speed is preferably 12 to 1,000 rpm, more preferably 12 to 200 rpm. Specifically, for example, an oven equipped with a rotational mechanism may be used.

Even when the crosslinking step is not additionally performed, the tire is preferably rotated in the circumferential direction of the tire until the crosslinking reaction of the sealant is completed. In this case, flowing of even the just-applied, easily flowing sealant can be prevented and the crosslinking reaction can be accomplished without deterioration of uniformity. The rotational speed is the same as described for the crosslinking step.

In order to improve the rate of crosslinking of the sealant, the tire is preferably preliminarily warmed before the application of the sealant. In this case, a self-sealing tire can be produced with higher productivity. The temperature for pre-heating the tire is preferably 40° C. to 100° C., more preferably 50° C. to 70° C. When the tire is pre-heated within the temperature range indicated above, the crosslinking reaction suitably begins upon the application and more suitably proceeds so that a self-sealing tire having high sealing performance can be produced. Moreover, when the tire is pre-heated within the temperature range indicated above, the crosslinking step is not necessary and thus a self-sealing tire can be produced with high productivity.

In general, continuous kneaders (especially twin screw kneading extruders) are continuously operated. In the production of self-sealing tires, however, tires need to be replaced one after another upon completion of the application of the sealant to one tire. Here, in order to produce a higher quality self-sealing tire while reducing the deterioration of productivity, the following method (1) or (2) may be used. The method (1) or (2) may be appropriately selected depending on the situation, in view of the following disadvantages: a deterioration in quality in the method (1) and an increase in cost in the method (2).

(1) The feed of the sealant to the inner periphery of the tire is controlled by running or stopping the continuous kneader and all the feeders simultaneously.

Specifically, upon completion of the application to one tire, the continuous kneader and all the feeders may be simultaneously stopped, the tire may be replaced with another tire, preferably within one minute, and the continuous kneader and all the feeders may be simultaneously allowed to run to restart the application to the tire. By replacing tires quickly, preferably within one minute, the deterioration in quality can be reduced.

(2) The feed of the sealant to the inner periphery of the tire is controlled by switching flow channels while allowing the continuous kneader and all the feeders to keep running.

Specifically, the continuous kneader may be provided with another flow channel in addition to the nozzle for direct feeding to the tire inner periphery, and the prepared sealant may be discharged from the another flow channel after completion of the application to one tire until completion of the replacement of tires. According to this method, since a self-sealing tire can be produced while the continuous kneader and all the feeders are kept running, the produced self-sealing tire can have higher quality.

Non-limiting examples of carcass cords that can be used in the carcass of the self-sealing tire include fiber cords and steel cords. Steel cords are preferred among these. In particular, steel cords formed of hard steel wire materials specified in JIS G 3506 are desirable. The use of strong steel cords, instead of commonly used fiber cords, as carcass cords in the self-sealing tire can greatly improve side cut resistance (resistance to cuts formed in the tire side portions due to driving over curbs or other reasons) and thereby further improve the puncture resistance of the entire tire including the side portions.

The steel cord may have any structure. Examples include steel cords having a 1×n single strand structure, steel cords having a k+m layer strand structure, steel cords having a 1×n bundle structure, and steel cords having an m×n multi-strand structure. The term "steel cord having a 1×n single strand structure" refers to a single-layered twisted steel cord prepared by intertwining n filaments. The term "steel cord having a k+m layer strand structure" refers to a steel cord having a two-layered structure in which the two layers are different from each other in twist direction and twist pitch, and the inner layer includes k filaments while the outer layer includes m filaments. The term "steel cord having a 1×n bundle structure" refers to a bundle steel cord prepared by intertwining bundles of n filaments. The term "steel cord having an m×n multi-strand structure" refers to a multi-strand steel cord prepared by intertwining m strands prepared by first twisting n filaments together. Here, n represents an integer of 1 to 27; k represents an integer of 1 to 10; and m represents an integer of 1 to 3.

The twist pitch of the steel cord is preferably 13 mm or less, more preferably 11 mm or less, but preferably 5 mm or more, more preferably 7 mm or more.

The steel cord preferably contains at least one piece of preformed filament formed in the shape of a spiral. Such a preformed filament provides a relatively large gap within the steel cord to improve rubber permeability and also maintain the elongation under low load, so that a molding failure during vulcanization can be prevented.

The surface of the steel cord is preferably plated with brass, Zn, or other materials to improve initial adhesion to the rubber composition.

The steel cord preferably has an elongation of 0.5% to 1.5% under a load of 50 N. If the elongation under a load of 50 N is more than 1.5%, the reinforcing cords may exhibit reduced elongation under high load and thus disturbance absorption may not be maintained. Conversely, if the elongation under a load of 50 N is less than 0.5%, the cords may not exhibit sufficient elongation during vulcanization and thus a molding failure may occur. In view of the above, the elongation under a load of 50 N is more preferably 0.7% or more, but more preferably 1.3% or less.

The endcount of the steel cords is preferably 20 to 50 (ends/5 cm).

Second Embodiment

The studies of the present inventors have further revealed that the use of the method according to the first embodiment alone has the following disadvantage: a sealant having a generally string shape is occasionally difficult to attach to the inner periphery of a tire and can easily peel off especially at the attachment start portion. A second embodiment is characterized in that in the method for producing a self-sealing tire, the sealant is first attached under conditions where the distance between the inner periphery of the tire and the tip of the nozzle is adjusted to a distance $d_1$ and then to a distance $d_2$ larger than the distance $d_1$. In this case, the distance between the inner periphery of the tire and the tip of the nozzle is shortened at the beginning of the attachment, so that the width of the sealant corresponding to the attachment start portion can be increased. As a result, a self-sealing tire can be easily produced in which a generally string-shaped adhesive sealant is continuously and spirally attached at least to the inner periphery of the tire that corresponds to a tread portion, and at least one of the longitudinal ends of the sealant forms a wider portion having a width larger than that of the longitudinally adjoining portion. In this self-sealing tire, a portion of the sealant that corresponds to starting of attachment has a larger width to improve adhesion of this portion so that peeling of this portion of the sealant can be prevented.

The description of the second embodiment basically includes only features different from the first embodiment, and the contents overlapping the description of the first embodiment are omitted.

Figure 5A:
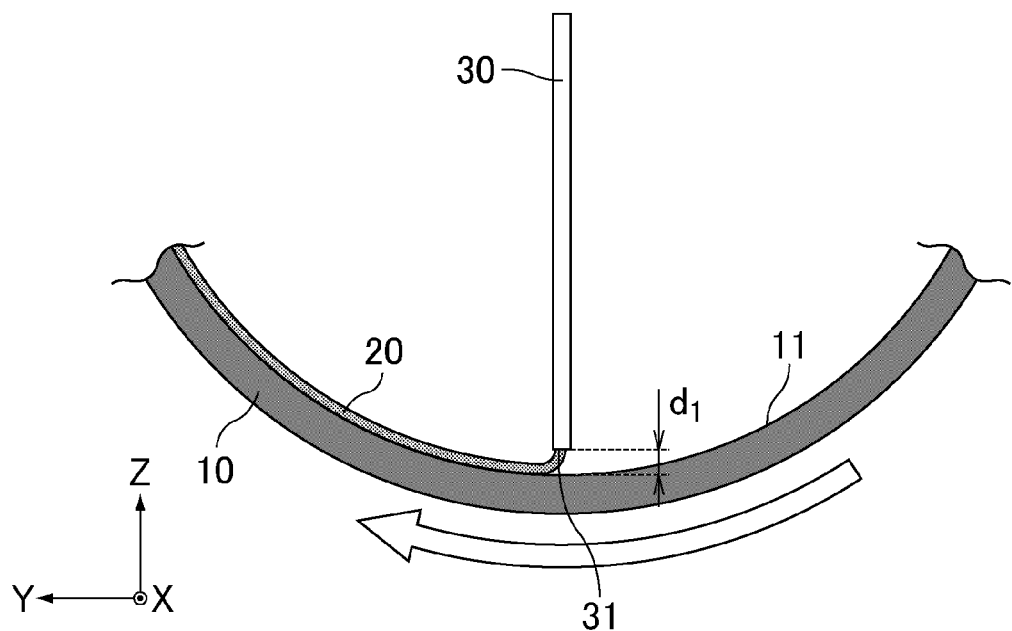
FIGS. 5A and 5B are enlarged views showing the vicinity of the tip of the nozzle included in the applicator shown in FIG. 1.
Figure 5B:
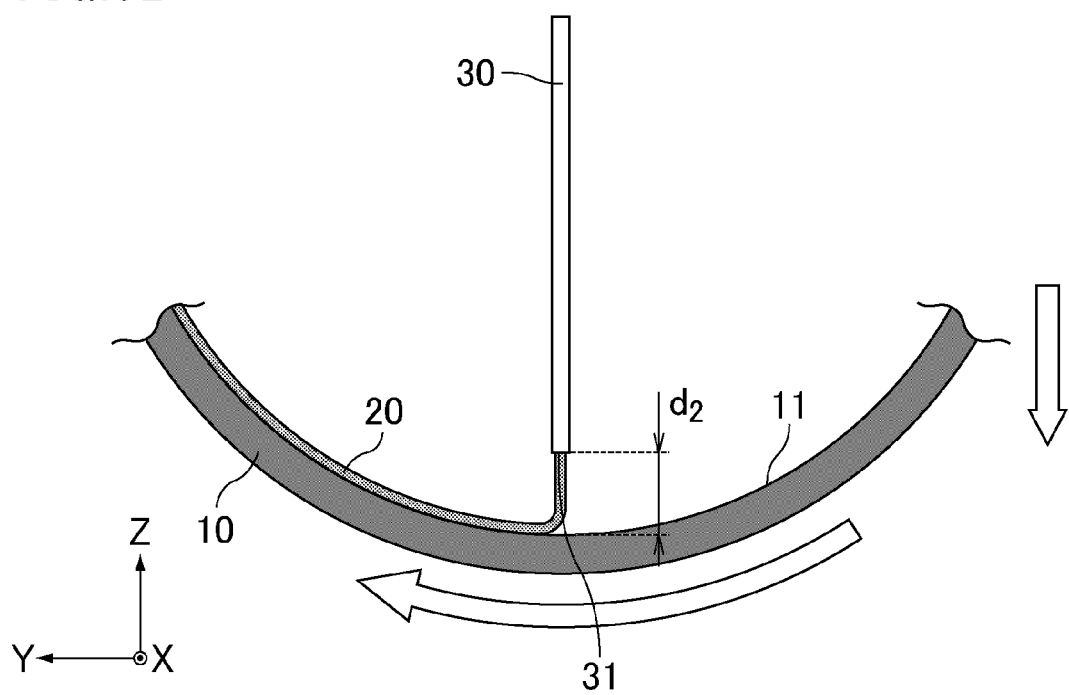

FIG. 5 are enlarged views showing the vicinity of the tip of the nozzle included in the applicator shown in FIG. 1. FIG. 5(*a*) illustrates a status immediately after attachment of the sealant is started and FIG. 5(*b*) illustrates a status after a lapse of a predetermined time.

FIG. 5 each show a cross section of a part of a tire 10 taken along a plane including the circumferential and radial directions of the tire. In FIG. 5, the width direction (axis direction) of the tire is indicated by an arrow X, the circumferential direction of the tire is indicated by an arrow Y, and the radial direction of the tire is indicated by an arrow Z.

According to the second embodiment, the tire 10 formed through a vulcanization step is first mounted on a rotary drive device, and a nozzle 30 is inserted into the inside of the tire 10. Then, as shown in FIG. 1 and FIG. 5, the tire 10 is rotated and simultaneously moved in the width direction while a sealant 20 is discharged from the nozzle 30, whereby the sealant is continuously applied to the inner periphery 11 of the tire 10. The tire 10 is moved in the width direction according to, for example, the pre-entered profile of the inner periphery 11 of the tire 10.

Since the sealant 20 is adhesive and has a generally string shape, the sealant 20 is continuously and spirally attached to the inner periphery 11 of the tire 10 that corresponds to a tread portion.

In this process, as shown in FIG. 5(*a*), the sealant 20 is attached under conditions where the distance between the inner periphery 11 of the tire 10 and the tip 31 of the nozzle 30 is adjusted to a distance $d_1$ for a predetermined time from the start of the attachment. Then, after a lapse of the predetermined time, as shown in FIG. 5(*b*), the tire 10 is moved in the radial direction to change the distance to a distance $d_2$ larger than the distance $d_1$ and the sealant 20 is attached.

The distance may be changed from the distance $d_2$ back to the distance $d_1$ before completion of the attachment of the sealant. In view of production efficiency and tire weight balance, the distance $d_2$ is preferably maintained until the sealant attachment is completed.

Preferably, the distance $d_1$ is kept constant for a predetermined time from the start of the attachment, and after a lapse of the predetermined time the distance $d_2$ is kept constant, although the distances $d_1$ and $d_2$ are not necessarily constant as long as they satisfy the relation of $d_1 < d_2$.

The distance $d_1$ is not particularly limited. In order to provide more suitable effects, the distance $d_1$ is preferably 0.2 mm or more, more preferably 0.3 mm or more, still more preferably 0.5 mm or more. If the distance $d_1$ is less than 0.2 mm, the tip of the nozzle is too close to the inner periphery of the tire, so that the sealant can easily adhere to the nozzle and the nozzle may need to be cleaned more frequently. The distance $d_1$ is also preferably 2 mm or less, more preferably 1 mm or less. If the distance $d_1$ is more than 2 mm, the effect produced by the formation of a wider portion may not be sufficient.

The distance $d_2$ is also not particularly limited. In order to provide more suitable effects, the distance $d_2$ is preferably 0.3 mm or more, more preferably 1 mm or more, but preferably 3 mm or less, more preferably 2 mm or less. The distance $d_2$ is preferably the same as the controlled distance $d_0$ described above.

Herein, the distances $d_1$ and $d_2$ between the inner periphery of the tire and the tip of the nozzle each refer to the distance in the radial direction of the tire between the inner periphery of the tire and the tip of the nozzle.

The rotational speed of the tire during the attachment of the sealant is not particularly limited. In order to provide more suitable effects, the rotational speed is preferably 5 m/min or higher, more preferably 10 m/min or higher, but preferably 40 m/min or lower, more preferably 30 m/min or lower, still more preferably 20 m/min or lower. If the rotational speed is lower than 5 m/min or higher than 40 m/min, a sealant having a uniform thickness cannot be easily attached.

The self-sealing tire according to the second embodiment can be produced through the steps described above.

Figure 6:
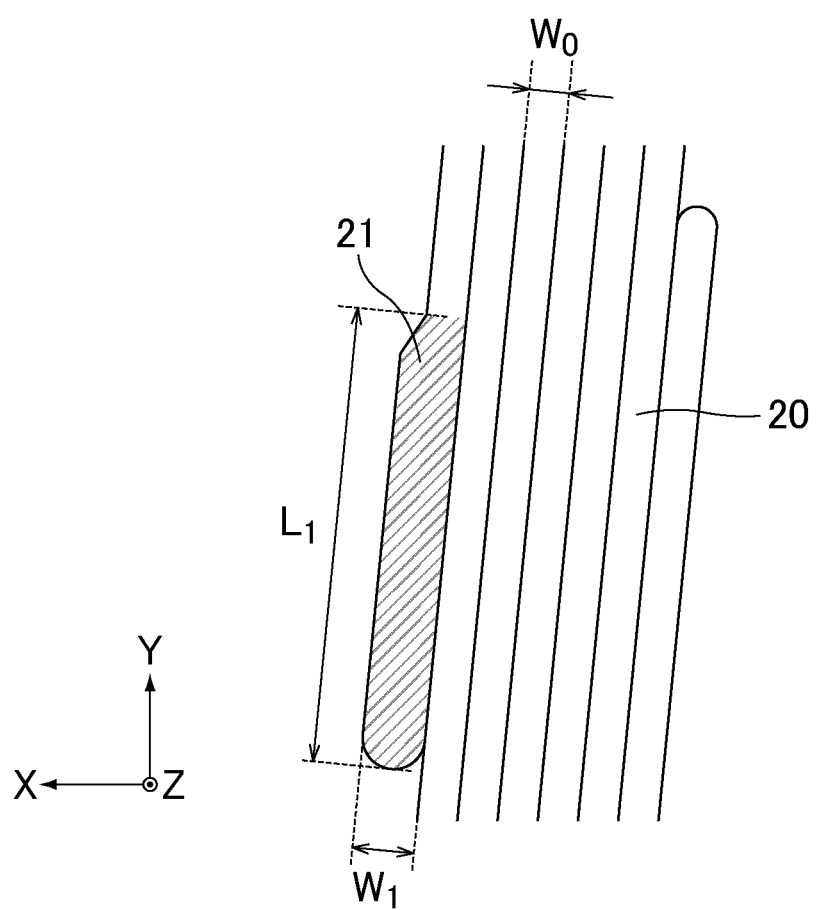
FIG. 6 is an explanatory view schematically showing an example of a sealant attached to a self-sealing tire.

FIG. 6 is an explanatory view schematically showing an example of a sealant attached to a self-sealing tire according to the second embodiment.

The generally string-shaped sealant 20 is wound in the circumferential direction of the tire and continuously and spirally attached. Here, one of the longitudinal ends of the sealant 20 forms a wider portion 21 having a width larger than that of the longitudinally adjoining portion. The wider portion 21 corresponds to the attachment start portion of the sealant.

The width of the wider portion of the sealant (width of the wider portion of the applied sealant, length indicated by $W_1$ in FIG. 6) is not particularly limited. In order to provide more suitable effects, the width of the wider portion is preferably 103% or more, more preferably 110% or more, still more preferably 120% or more of the width of the sealant other than the wider portion (length indicated by $W_0$ in FIG. 6). If it is less than 103%, the effect produced by the formation of a wider portion may not be sufficient. The width of the wider portion of the sealant is also preferably 210% or less, more preferably 180% or less, still more preferably 160% or less of the width of the sealant other than the wider portion. If it is more than 210%, the tip of the nozzle needs to be placed excessively close to the inner periphery of the tire to form a wider portion, with the result that the sealant can easily adhere to the nozzle and the nozzle may need to be cleaned more frequently. In addition, tire weight balance may be impaired.

The width of the wider portion of the sealant is preferably substantially constant in the longitudinal direction but may partially be substantially not constant. For example, the wider portion may have a shape in which the width is the largest at the attachment start portion and gradually decreases in the longitudinal direction. The substantially constant width as used herein means that the width varies within a range of 90% to 110%, preferably 97% to 103%, more preferably 98% to 102%, still more preferably 99% to 101%.

The length of the wider portion of the sealant (length of the wider portion of the applied sealant, length indicated by $L_1$ in FIG. 6) is not particularly limited. In order to provide more suitable effects, the length is preferably less than 650 mm, more preferably less than 500 mm, still more preferably less than 350 mm, particularly preferably less than 200 mm. If the length is 650 mm or more, the tip of the nozzle is placed close to the inner periphery of the tire for a longer period of time, so that the sealant can easily adhere to the nozzle and the nozzle may need to be cleaned more frequently. In addition, tire weight balance may be impaired. The sealant preferably has a shorter wider portion. However, for control of the distance between the inner periphery of the tire and the tip of the nozzle, the limit of the length of the wider portion is about 10 mm.

The width of the sealant other than the wider portion (width of the applied sealant other than the wider portion, length indicated by $W_0$ in FIG. 6) is not particularly limited. In order to provide more suitable effects, the width is preferably 0.8 mm or more, more preferably 1.3 mm or more, still more preferably 1.5 mm or more. If the width is less than 0.8 mm, the number of turns of the sealant around the inner periphery of the tire may increase, reducing production efficiency. The width of the sealant other than the wider portion is also preferably 18 mm or less, more preferably 13 mm or less, still more preferably 9.0 mm or less, particularly preferably 7.0 mm or less, most preferably 6.0 mm or less, still most preferably 5.0 mm or less. If the width is more than 18 mm, a weight imbalance may be more likely to occur. $W_0$ is preferably the same as the above-described W.

The width of the sealant other than the wider portion is preferably substantially constant in the longitudinal direction but may partially be substantially not constant.

The width of the area where the sealant is attached (hereinafter also referred to as the width of the attached area or the width of the sealant layer, and corresponding to a length equal to $W_1 + 6 \times W_0$ in FIG. 6) is not particularly limited. In order to provide more suitable effects, the width is preferably 80% or more, more preferably 90% or more, still more preferably 100% or more, but preferably 120% or less, more preferably 110% or less, of the tread contact width.

In order to provide more suitable effects, the width of the sealant layer is preferably 85% to 115%, more preferably 95% to 105% of the width of the breaker of the tire (length of the breaker in the width direction of the tire).

In the self-sealing tire according to the second embodiment, the sealant is preferably attached without overlapping in the width direction, more preferably without gaps.

In the self-sealing tire according to the second embodiment, the other longitudinal end (the end corresponding to the attachment ending portion) of the sealant may also form a wider portion having a width larger than that of the longitudinally adjoining portion.

The thickness of the sealant (thickness of the applied sealant or the sealant layer, length indicated by D in FIG. 8) is not particularly limited. In order to provide more suitable effects, the thickness of the sealant is preferably 1.0 mm or more, more preferably 1.5 mm or more, still more preferably 2.0 mm or more, particularly preferably 2.5 mm or more, but preferably 10 mm or less, more preferably 8.0 mm or less, still more preferably 5.0 mm or less. If the thickness is less than 1.0 mm, a puncture hole formed in the tire is difficult to reliably seal. Also, a thickness of more than 10 mm is not preferred because tire weight increases, although with little improvement in the effect of sealing puncture holes.

The sealant preferably has a substantially constant thickness (thickness of the applied sealant or the sealant layer). In this case, the deterioration of tire uniformity can be further prevented and a self-sealing tire having much better weight balance can be produced.

The ratio of the thickness of the sealant (thickness of the applied sealant or the sealant layer, length indicated by D in FIG. 8) to the width of the sealant other than the wider portion (width of the applied sealant other than the wider portion, length indicated by $W_0$ in FIG. 6) [(thickness of sealant)/(width of sealant other than wider portion)] is preferably 0.6 to 1.4, more preferably 0.7 to 1.3, still more preferably 0.8 to 1.2, particularly preferably 0.9 to 1.1. A ratio closer to 1.0 results in a sealant having an ideal string shape so that a self-sealing tire having high sealing performance can be produced with higher productivity.

In order to provide more suitable effects, the cross-sectional area of the sealant (cross-sectional area of the applied sealant, area calculated by D×W in FIG. 8) is preferably 0.8 mm$^2$ or more, more preferably 1.95 mm$^2$ or more, still more preferably 3.0 mm$^2$ or more, particularly preferably 3.75 mm$^2$ or more, but preferably 180 mm$^2$ or less, more preferably 104 mm$^2$ or less, still more preferably 45 mm$^2$ or less, particularly preferably 35 mm$^2$ or less, most preferably 25 mm$^2$ or less.

According to the second embodiment, even when the sealant has a viscosity within the range indicated earlier, and particularly a relatively high viscosity, widening a portion of the sealant that corresponds to starting of attachment can improve adhesion of this portion so that peeling of this portion of the sealant can be prevented.

The self-sealing tire according to the second embodiment is preferably produced as described above. However, the self-sealing tire may be produced by any other appropriate method as long as at least one of the ends of the sealant is allowed to form a wider portion.

Although the above descriptions, and particularly the description of the first embodiment, explain the case where a non-contact displacement sensor is used in applying the sealant to the inner periphery of the tire, the sealant may be applied to the inner periphery of the tire while controlling the movement of the nozzle and/or the tire according to the pre-entered coordinate data without measurement using a non-contact displacement sensor.

EXAMPLES

The present invention is specifically described with reference to, but not limited to, examples below.

The chemicals used in the examples are listed below.
Butyl rubber: IIR065 available from JSR Corporation
Polybutene: HV-1900 available from JX Nippon Oil & Energy Corporation, number average molecular weight: 2,900
Carbon black: N330 available from Cabot Japan K.K.
Oil: DOS (dioctyl sebacate) available from Taoka Chemical Co., Ltd.
Crosslinking agent: NYPER NS (BPO: 40%, DBP: 48%) available from NOF Corporation
Crosslinking activator: Q0 (quinone dioxime) available from Ouchi Shinko Chemical Industrial Co., Ltd.

<Preparation of Sealants>

A sealant was prepared by kneading the raw materials according to the formulation shown in Table 1 at 120° C. using a twin screw kneading extruder.

TABLE 1

| Raw material | Formulation (parts by mass) |
| --- | --- |
| Butyl rubber | 100 |
| Polybutene | 200 |
| Carbon black | 15 |
| Oil | 15 |
| Crosslinking agent | 7 |
| Crosslinking activator | 7 |

EXAMPLES AND COMPARATIVE EXAMPLE

The sealant (viscosity at 40° C.: 20,000 Pa·s) was extruded from a twin screw kneading extruder and attached through a nozzle to the inner periphery of a tire (235/45R17, 94W, outer diameter: 643 mm, tread contact width: 200 mm, vulcanized, tire rotational speed: 12 m/min, pre-heating temperature: 40° C.) mounted on a rotary drive device, so that the attached sealant had a thickness of 3 mm and the width of the attached area was 210 mm (105% of the tread contact width) to prepare a self-sealing tire. In this process, the approach distance between the tip of the nozzle and the inner periphery of the tire and its duration were controlled at the beginning of the attachment so that the width and length of the wider portion of the attached sealant and the width of the sealant other than the wider portion were adjusted as shown in Table 2. The width of the wider portion and the width of the sealant other than the wider portion were adjusted so as to be substantially constant in the longitudinal direction. The viscosity of the sealant was measured at 40° C. in conformity with JIS K 6833 using a rotational viscometer. The diameter of the discharge port of the nozzle (nozzle diameter) was set as follows: Example 6: 0.8 mm; Example 7: 1.2 mm; Example 8: 5.0 mm; Example 9: 7.0 mm; and other examples: 3.0 mm.

<Evaluation Items and Test Methods>

The prepared self-sealing tires were evaluated for the items below. Table 2 shows the results.

(Attachment Success Rate)

Ten self-sealing tires (n=10) were prepared in each example or comparative example and visually observed to determine whether the attachment start portion of the sealant was peeled. Tires without and with sealant peeling were rated as "success" and "failure", respectively, based on which the success rate (%) of the attachment of the sealant was determined. A higher rate indicates better adhesion of the sealant. A rate of 80% or higher was considered to be good.

(Amount of Imbalance)

The weight balance of each tire before the attachment of the sealant was measured with a common balancer and then controlled based on the measurement. After the sealant was attached, the weight balance of the tire was again measured to determine the amount of additional weight. The average of the amounts of additional weight (n=10) was taken as the amount (g) of imbalance in each example or comparative example. A smaller value indicates better weight balance. An amount of 5 g or smaller was considered to be good.

(Cleaning Frequency)

Self-sealing tires were produced under the same conditions in each example or comparative example to determine the number of tires produced before the nozzle needed to be cleaned, which was taken as the nozzle cleaning frequency (expressed in the number of tires). A larger value indicates lower frequency of cleaning. Frequencies of at least 3 tires and of at least 8 tires were considered to be good and especially good, respectively. When the nozzle did not need cleaning in the production of fifty self-sealing tires under the same conditions, the nozzle cleaning frequency was displayed as "unnecessary".

14 Tread portion
15 Carcass
16 Breaker
17 Band
20 Sealant
21 Wider portion
30 Nozzle
31 Tip of nozzle
40 Non-contact displacement sensor
50 Rotary drive device
60 Twin screw kneading extruder
61 (61a, 61b, 61c) Supply port
62 Material feeder
d, $d_0$, $d_1$, $d_2$ Distance between inner periphery of tire and tip of nozzle

The invention claimed is:

1. A pneumatic tire, comprising a generally string-shaped adhesive sealant, wherein
the sealant is continuously and spirally attached at least to an inner periphery of the tire that corresponds to a tread portion to form a sealant layer,

TABLE 2

| | Unit | Com. Ex. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| Length of attachment to tire | m | 101 | 101 | 101 | 101 | 101 | 101 | 404 | 269 | 51 | 40 | 101 | 101 | 101 | 101 | 101 |
| Width of wider portion (a) | mm | 4 | 6 | 7 | 8 | 5 | 4.2 | 1.5 | 2.25 | 12.75 | 15 | 6 | 6 | 6 | 6 | 6 |
| Width of portion other than wider portion (b) | mm | 4 | 4 | 4 | 4 | 4 | 4 | 1 | 1.5 | 8.5 | 10 | 4 | 4 | 4 | 4 | 4 |
| (a)/(b) | % | 100 | 150 | 175 | 200 | 125 | 105 | 150 | 150 | 150 | 150 | 150 | 150 | 150 | 150 | 150 |
| Length of wider portion | mm | — | 150 | 150 | 150 | 150 | 150 | 150 | 150 | 150 | 150 | 10 | 100 | 300 | 400 | 600 |
| d1 | mm | 2.0 | 1.0 | 0.5 | 0.2 | 1.3 | 1.9 | 1.0 | 1.0 | 1.0 | 1.0 | 1.0 | 1.0 | 1.0 | 1.0 | 1.0 |
| d2 | mm | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Attachment success rate | % | 10 | 100 | 100 | 100 | 100 | 90 | 100 | 100 | 100 | 100 | 100 | 100 | 100 | 100 | 100 |
| Amount of imbalance | g | 0 | 0 | 0 | 0 | 0 | 0 | 0 | 0 | 1 | 3 | 0 | 0 | 0 | 0 | 0 |
| Nozzle cleaning frequency | tires | Unnecessary | 10 | 9 | 3 | 12 | 16 | 10 | 10 | 10 | 10 | 20 | 16 | 9 | 8 | 3 |

The results in Table 2 demonstrate that, in the case of the self-sealing tires of the examples in which at least one of the longitudinal ends of the sealant formed a wider portion having a width larger than that of the longitudinally adjoining portion, the attachment success rate was high and peeling of this portion of the sealant was prevented.

The results further demonstrate that when the width and length of the wider portion of the attached sealant and the width of the sealant other than the wider portion were adjusted within specific ranges, self-sealing tires having good weight valance were obtained and the nozzle cleaning frequency in the production of the self-sealing tires was also reduced.

REFERENCE SIGNS LIST

10 Tire
11 Inner periphery of tire the sealant has a wider portion on at least one of longitudinal ends thereof, each wider portion having a width larger than that of the remaining portion,
the sealant layer is formed of the generally string-shaped sealant provided continuously and spirally along the inner periphery of the tire, and
the remaining portion has a constant width and the width of each wider portion is 103% to 180% of the width of the remaining portion.

2. The pneumatic tire according to claim 1, wherein the remaining portion has a width of 1.3 to 13 mm.

3. The pneumatic tire according to claim 1, wherein each wider portion of the sealant has a length shorter than 500 mm.

4. The pneumatic tire according to claim 1, wherein the area where the sealant is attached has a width that is 80% to 120% of the tread contact width.

5. The pneumatic tire according to claim 1, wherein the sealant has a thickness of 1 to 10 mm.

6. A method for producing a pneumatic tire according to claim 1, the method comprising
- discharging the generally string-shaped adhesive sealant from a nozzle to continuously and spirally attach the sealant at least to the inner periphery of the tire that corresponds to the tread portion to form the sealant layer,
- the sealant being attached under conditions where a distance between the inner periphery of the tire and a tip of the nozzle is adjusted to a distance di and then to a distance d2 larger than the distance di so that the at least one of longitudinal ends of the sealant forms each wider portion having a width larger than that of the remaining portion.

7. The method for producing a pneumatic tire according to claim 6, wherein the sealant is extruded from a twin screw kneading extruder and fed to the nozzle.

* * * * *